United States Patent
Ohba et al.

(10) Patent No.: US 10,991,071 B2
(45) Date of Patent: Apr. 27, 2021

(54) INFORMATION PROCESSING APPARATUS AND RECORDING MEDIUM

(71) Applicants: Kazuhiro Ohba, Kanagawa (JP); Keitaro Shimizu, Chiba (JP); Hitomi Mizutani, Tokyo (JP); Tomohiko Sasaki, Tokyo (JP); Tetsuyuki Osaki, Tottori (JP); Mitsuhiko Hirose, Kanagawa (JP)

(72) Inventors: Kazuhiro Ohba, Kanagawa (JP); Keitaro Shimizu, Chiba (JP); Hitomi Mizutani, Tokyo (JP); Tomohiko Sasaki, Tokyo (JP); Tetsuyuki Osaki, Tottori (JP); Mitsuhiko Hirose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 76 days.

(21) Appl. No.: 16/385,004

(22) Filed: Apr. 16, 2019

(65) Prior Publication Data
US 2019/0325558 A1    Oct. 24, 2019

(30) Foreign Application Priority Data

Apr. 18, 2018    (JP) .............................. JP2018-079561
May 31, 2018    (JP) .............................. JP2018-104862

(51) Int. Cl.
*G06T 3/40*    (2006.01)
*G06F 3/0484*    (2013.01)
(Continued)

(52) U.S. Cl.
CPC ........ *G06T 3/4007* (2013.01); *G06F 3/04817* (2013.01); *G06F 3/04842* (2013.01); *G06F 3/04845* (2013.01); *G06T 13/20* (2013.01)

(58) Field of Classification Search
CPC .......................... G06T 3/4007; G06F 3/04845
See application file for complete search history.

(56) References Cited

U.S. PATENT DOCUMENTS

| | | | | |
|---|---|---|---|---|
| 2003/0081671 A1* | 5/2003 | Ishida | .................... | H04H 20/12 375/240 |
| 2012/0076420 A1* | 3/2012 | Kono | .................... | H04N 5/142 382/199 |

(Continued)

FOREIGN PATENT DOCUMENTS

| | | |
|---|---|---|
| JP | 2015-018013 | 1/2015 |
| JP | 2017-158169 | 9/2017 |

*Primary Examiner* — Tuan H Nguyen
(74) *Attorney, Agent, or Firm* — Oblon, McClelland, Maier & Neustadt, L.L.P.

(57) ABSTRACT

An information processing apparatus includes a partial image generator configured to generate a partial image having a point-of-interest designated by a user, from a 360-degree image, a user interface (UI) unit configured to receive an indication of the point-of-interest via a UI screen for displaying the partial image, and a point-of-interest registering unit configured to register the point-of-interest, in response to a request from the user via the UI screen. The information processing apparatus also includes an interpolation line calculator configured to calculate an interpolation line for interpolating between a most recently registered point-of-interest and a current point-of-interest, and an interpolation line registering unit configured to register an interpolation line between the designated point-of-interest and a point-of-interest designated immediately prior to the designated point-of-interest.

11 Claims, 28 Drawing Sheets

(51) Int. Cl.
*G06T 13/20* (2011.01)
*G06F 3/0481* (2013.01)

(56) References Cited

U.S. PATENT DOCUMENTS

2015/0278249 A1* 10/2015 Akiyama ............. G06K 9/6892
382/305
2018/0150989 A1   5/2018 Mitsui et al.

* cited by examiner

FIG.5A
POINT-OF-INTEREST MANAGEMENT TABLE 500

| id | x | y | z | ELEVATION ANGLE | AZIMUTH ANGLE | colorR | colorG | colorB | colorA |
|---|---|---|---|---|---|---|---|---|---|
| 1 | 0 | 0 | 1 | 30 | 0 | 50 | 50 | 255 | 100 |
| 2 | 0.3 | 0.4 | 0.45 | 0 | 45 | 50 | 50 | 255 | 100 |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

FIG.5B
INTERPOLATION-LINE MANAGEMENT TABLE 600

| id | x | y | z | colorR | colorG | colorB | colorA |
|---|---|---|---|---|---|---|---|
| 1 | 0 | 0 | 1 | 50 | 50 | 255 | 100 |
| 2 | 0.01 | 0.01 | 0.99 | 50 | 50 | 255 | 100 |
| 3 | 0.02 | 0.02 | 0.96 | 50 | 50 | 255 | 100 |
| ... | ... | ... | ... | ... | ... | ... | ... |
| ... | ... | ... | ... | ... | ... | ... | ... |

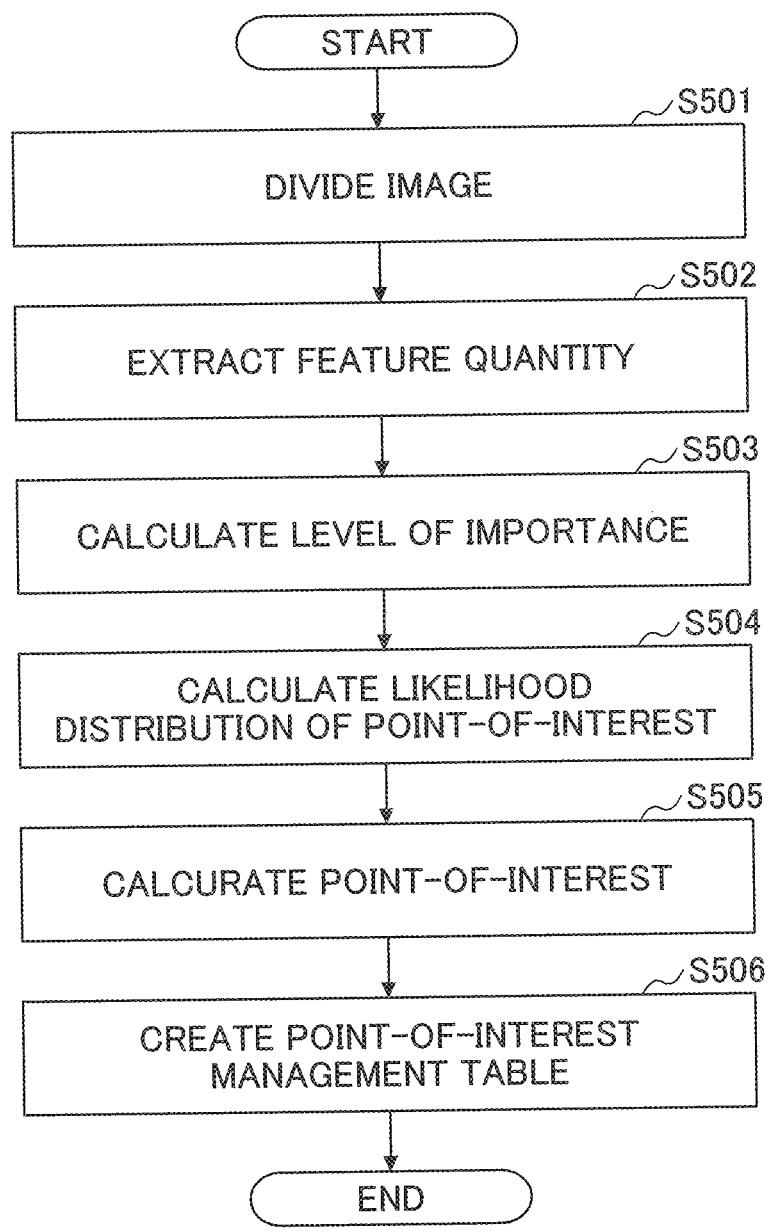

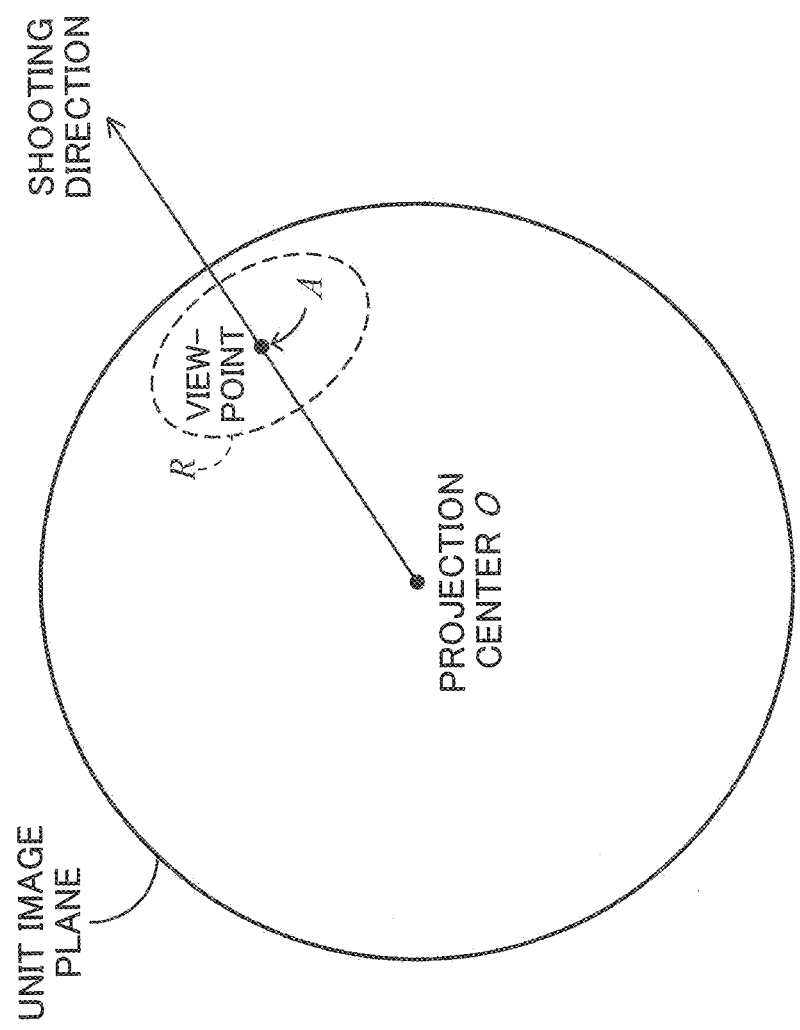

FIG.25

POINT-OF-INTEREST MANAGEMENT TABLE 700

| id | x | y | z | LATITUDE φ | LONGITUDE θ |
|---|---|---|---|---|---|
| 1 | 0 | 0 | 1 | 30 | 0 |
| 2 | 0.3 | 0.4 | 0.45 | 0 | 45 |
| ... | ... | ... | ... | ... | ... |
| ... | ... | ... | ... | ... | ... |
| ... | ... | ... | ... | ... | ... |
| ... | ... | ... | ... | ... | ... |

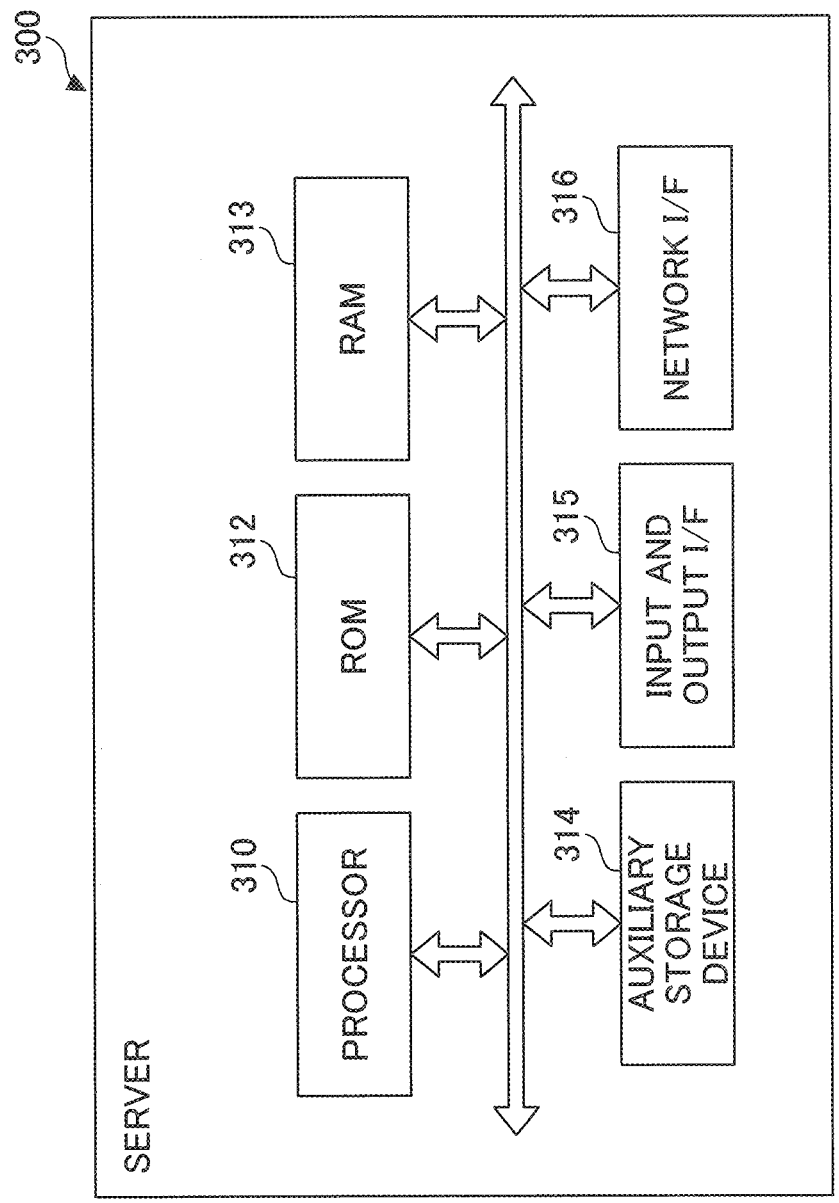

INFORMATION PROCESSING APPARATUS AND RECORDING MEDIUM

CROSS-REFERENCE TO RELATED APPLICATION

The present application claims priority under 35 U.S.C. § 119 to Japanese Patent Application Nos. 2018-079561 filed on Apr. 18, 2018, and 2018-104862 filed on May 31, 2018. The entire contents of which are incorporated herein by reference in there entity.

BACKGROUND OF THE INVENTION

1. Field of the Invention

The present disclosure relates to an information processing apparatus and a recording medium.

2. Description of the Related Art

In these days, with the spread of 360-degree cameras, a dedicated viewer has been used for viewing 360-degree images photographed from all directions at a shooting point. The dedicated viewer for a 360-degree image refers to an application that generates a 3D (dimensional) model by mapping the 360-degree image on a surface of a predetermined 3D object, and displays a 2D (dimensional) image that is obtained by a projective transformation of a part of areas of the 3D model with respect to the 360-degree image according to a user's operation (e.g., pan, tilt or zoom) of changing a display area.

In searching an area-of-interest in the 360-degree image by using a conventional dedicated viewer, a user needs to entirely find the 360-degree image for checking, while changing a display area by a manual operation (e.g., pan, tilt or zoom).

In terms of this aspect described above, Japanese Unexamined Patent Application Publication No. 2015-18013 (Patent Document 1) discloses a display controlling apparatus that displays a list of areas-of-interest, each of which is preliminarily set as a thumbnail image, within a 360-degree image. Further, in response to selecting a thumbnail image, the display controlling apparatus entirely displays the corresponding area-of-interest.

According to the display controlling apparatus disclosed in Patent Document 1, the area-of-interest in the 360-degree image is easily searched, but the manual selection of a thumbnail image remains troublesome. Such an effort is increased with the increasing number of areas-of-interest.

SUMMARY OF THE INVENTION

In view of the point described above, an aspect of embodiments is directed to providing an information processing apparatus capable of presenting an area-of-interest of a 360-degree image in a visibly recognized way as well as decreasing an effort needed for a user's operation.

After careful consideration, the inventors lead to the following aspect of such an information processing apparatus.

One aspect of the information processing apparatus is provided, including a partial image generator configured to generate a partial image having a point-of-interest designated by a user, from a 360-degree image, a user interface (UI) unit configured to receive an indication of the point-of-interest via a UI screen for displaying the partial image, a point-of-interest registering unit configured to register the point-of-interest in response to a request from the user via the UI screen, an interpolation line calculator configured to calculate a first interpolation line for interpolating between a most recently registered point-of-interest and a current point-of-interest, and an interpolation line registering unit configured to register a second interpolation line between the designated point-of-interest and a point-of-interest designated immediately prior to the designated point-of-interest, and wherein the UI unit is configured to display the second interpolation line and the designated point-of-interest superimposed on the partial image in the UI screen.

BRIEF DESCRIPTION OF THE DRAWINGS

FIGS. 5A and 5B are diagrams illustrating an example of a point-of-interest management table according to one embodiment;

FIG. 21 is a flowchart illustrating an example of processing performed by the server according to another embodiment;

FIG. 24 is a conceptual diagram for explaining an example of processing performed by a likelihood-distribution calculator;

FIG. 25 is a diagram illustrating an example of a point-of-interest management table; and FIGS. 26A and 26B are diagrams illustrating an example of a hardware configuration according to the embodiments.

DETAILED DESCRIPTION OF THE EMBODIMENTS

Figure 1:
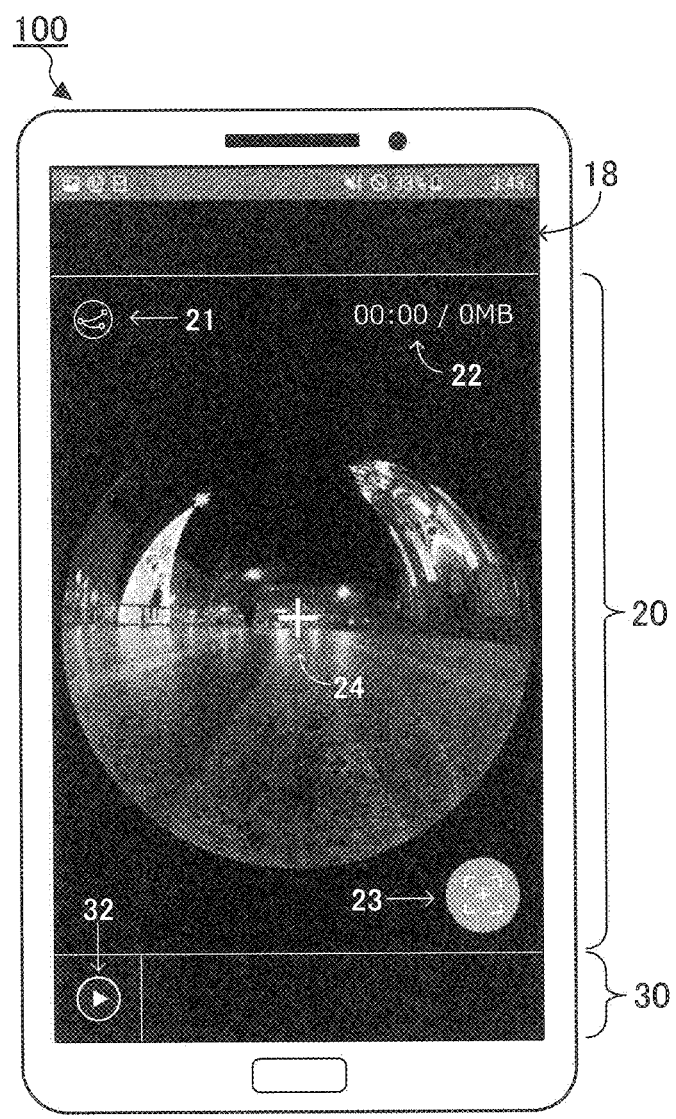
FIG. 1 is a diagram illustrating an example of a smartphone according to one embodiment.

The following illustrates embodiments for carrying out the present invention with reference to the drawings, but the present invention is not limited to the embodiments. The same reference numerals are used to denote same components in each drawing; accordingly, for the same components, explanation may be omitted.

Explanation will be hereinafter provided for an information processing apparatus according to embodiments.

The information processing apparatus of the embodiments is an information processing apparatus that includes a display panel for displaying 360-degree images. The information processing apparatus includes various types of computer, such as a smartphone, a tablet, a laptop computer, or a desktop computer.

In the information processing apparatus of the present embodiment, an application program (hereafter a dedicated application) for executing an animation that allows any areas included in the 360-degree image to be continuously displayed is installed. This dedicated application provides a user interface (UI) screen for registering a point-of-interest in a 360-degree image. By use of the UI screen, a user registers, as the point-of-interest, any point in a 3D model in which the 360-degree image is mapped on a surface of a predetermined 3D object (e.g., an inner face of a sphere). Further, this dedicated application causes a transition of the point-of-interest along a pathway for interpolating with respect to two or more points-of-interest registered to the user, and executes an animation that allows partial images, each of which has a center at a partial-image-specific point-of-interest intended for the transition, to be displayed. It is noted that in the present embodiment, the "partial image" means a 2D image that is obtained by a projective transformation of an image region having a center at any point-of-interest on the 3D model defined based on the 360-degree image. Alternatively, the "partial image" means a 2D image that is obtained by a projective transformation of an image region having any point-of-interest on the 3D model defined based on the 360-degree image.

FIG. 1 illustrates a smartphone 100 used as an example of the information processing apparatus according to the present embodiment. As illustrated in FIG. 1, a UI screen for registering a point-of-interest for registering a point-of-interest in a 360-degree image (hereafter a UI screen) is displayed on a touch panel display 18 of the smartphone 100.

As illustrated in FIG. 1, the UI screen includes a partial-image-displaying region 20 and an icon-displaying region 30. In the partial-image-displaying region 20, a partial image that is obtained by a projective transformation of a part of image areas (e.g., an image area having a center at a point-of-interest designated by the user) of the 360-degree image is displayed. Further, a button 21 for switching display modes, information 22 for indicating an animation-replay time and a data capacity, a button 23 for registering a point-of-interest, and a cross-hair cursor 24 for indicating a point-of-interest in the 360-degree image are displayed. In the icon-displaying region 30, a button 32 for instructing to execute an animation, as well as various types of icon to be described below are displayed.

In the present embodiment, by swiping, in any direction, the partial-image-displaying region 20 in which the partial image is displayed, any point located on the 360-degree image can be designated. Also, by pinching the partial image, an angle of view with the 360-degree image can be designated.

Figure 2:
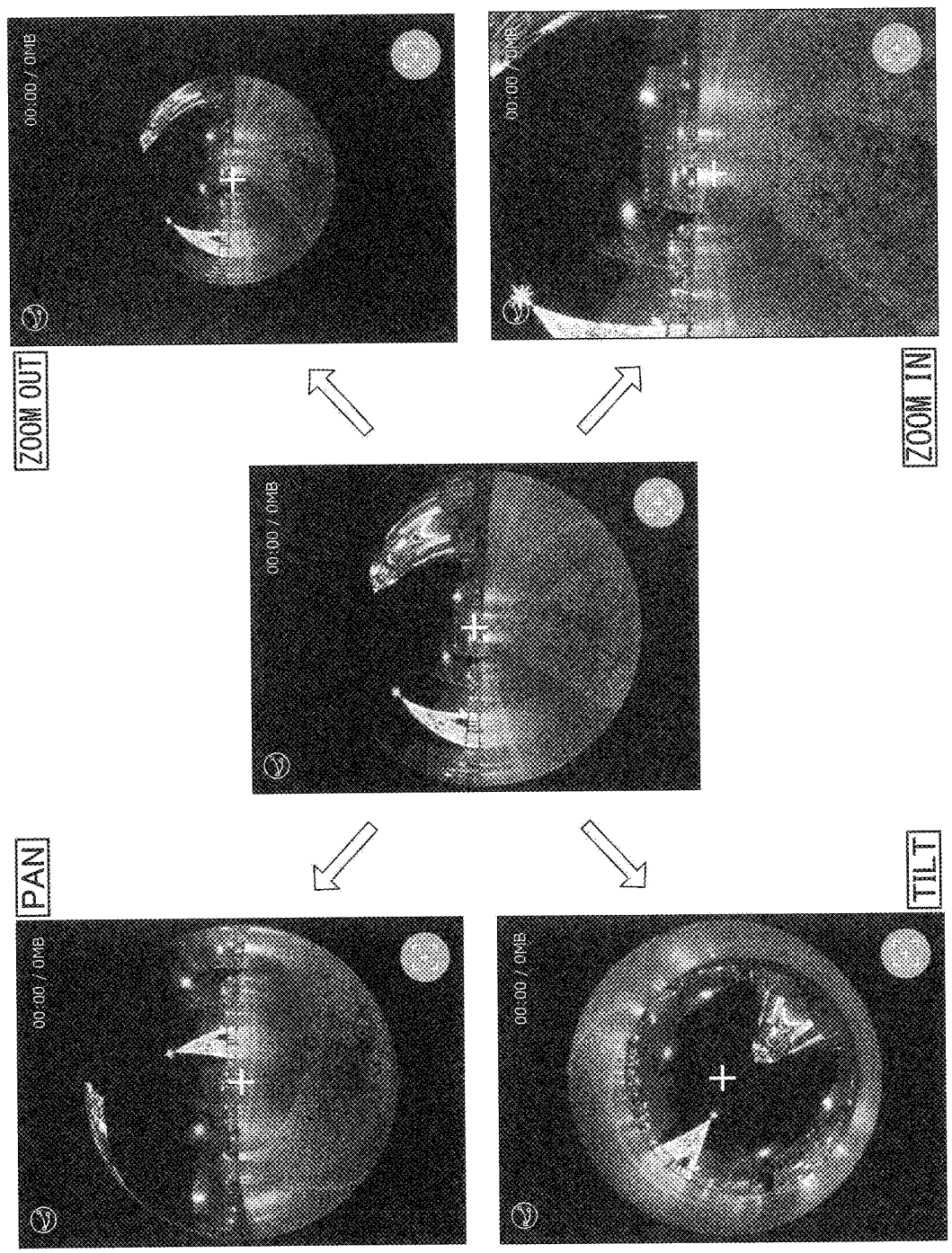
FIG. 2 is a conceptual diagram for explaining an example of an operation of designating a point-of-interest.

As an example, FIG. 2 illustrates a partial image panned or tilted by a swipe operation as well as a partial image zoomed in or zoomed out by a pinch-in or pinch-out operation. It is noted that in the present embodiment, the cross-hair cursor 24 (e.g., see FIG. 1) indicating a point-of-interest located on the 360-degree image is displayed at a center of the partial image at all times.

Figure 3:
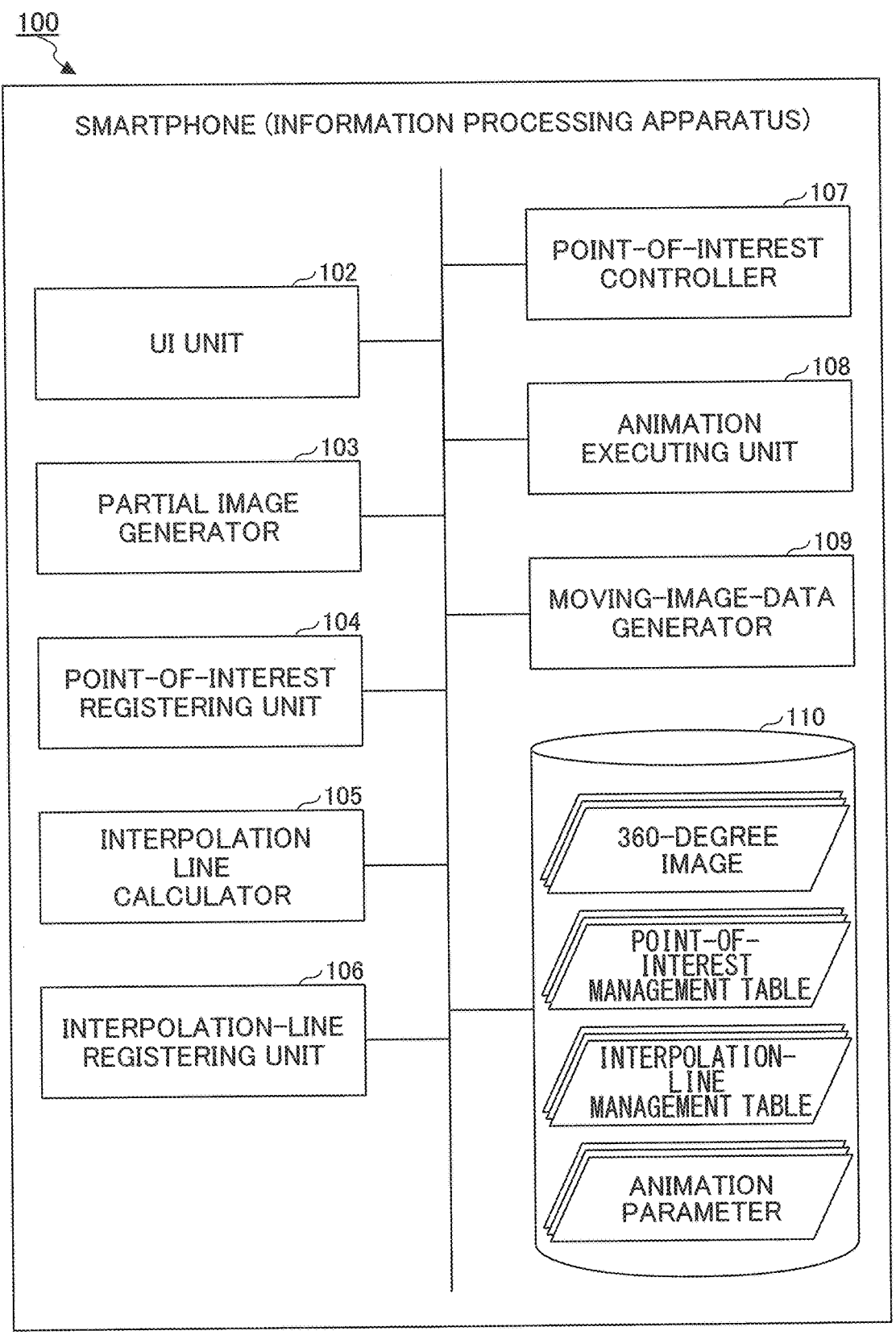
FIG. 3 is an example of a functional block diagram illustrating the smartphone according to one embodiment.

Next, with reference to a functional block diagram illustrated in FIG. 3, explanation will be provided for a functional configuration of the smartphone 100 of the present embodiment.

As illustrated in FIG. 3, the smartphone 100 includes a UI unit 102, a partial image generator 103, a point-of-interest registering unit 104, an interpolation-line calculator 105, an interpolation-line registering unit 106, a point-of-interest controller 107, an animation executing unit 108, a moving-image-data generator 109, and a storage area 110.

The UI unit 102 displays the UI screen described above on the touch panel display 18. In addition, the UI unit 102 receives various requests, such as a request to register a point-of-interest of the 360-degree image, via the UI screen.

The partial image generator 103 generates a partial image having a center at the point-of-interest designated by the user, from the 360-degree image retrieved from the storage area 110.

In response to receiving a registration request from the user via the UI screen, the point-of-interest registering unit 104 registers points-of-interest designated by the user in order of registration requests.

The interpolation-line calculator 105 calculates an interpolation line for interpolating a most recently registered point-of-interest and a currently designated point-of-interest (current point-of-interest).

The interpolation-line registering unit 106 registers the interpolation line between a newly registered point-of-interest and a point-of-interest registered immediately prior to the newly registered point-of-interest.

The point-of-interest controller 107 causes a transition of a point-of-interest along a pathway for interpolating with respect to at least two registered points-of-interest.

The animation executing unit 108 executes an animation that allows partial images, each of which has a center at a partial-image-specific point-of-interest intended for the transition, to be displayed in order of transitioning the points-of-interest.

The moving-image-data generator 109 converts generated multiple partial images into a moving image data in a universal file format.

The storage area 110 stores various types of data.

It is noted that in the present embodiment, a computer provided with the smartphone 100 executes the dedicated application to serve as the components described above.

Figure 4:
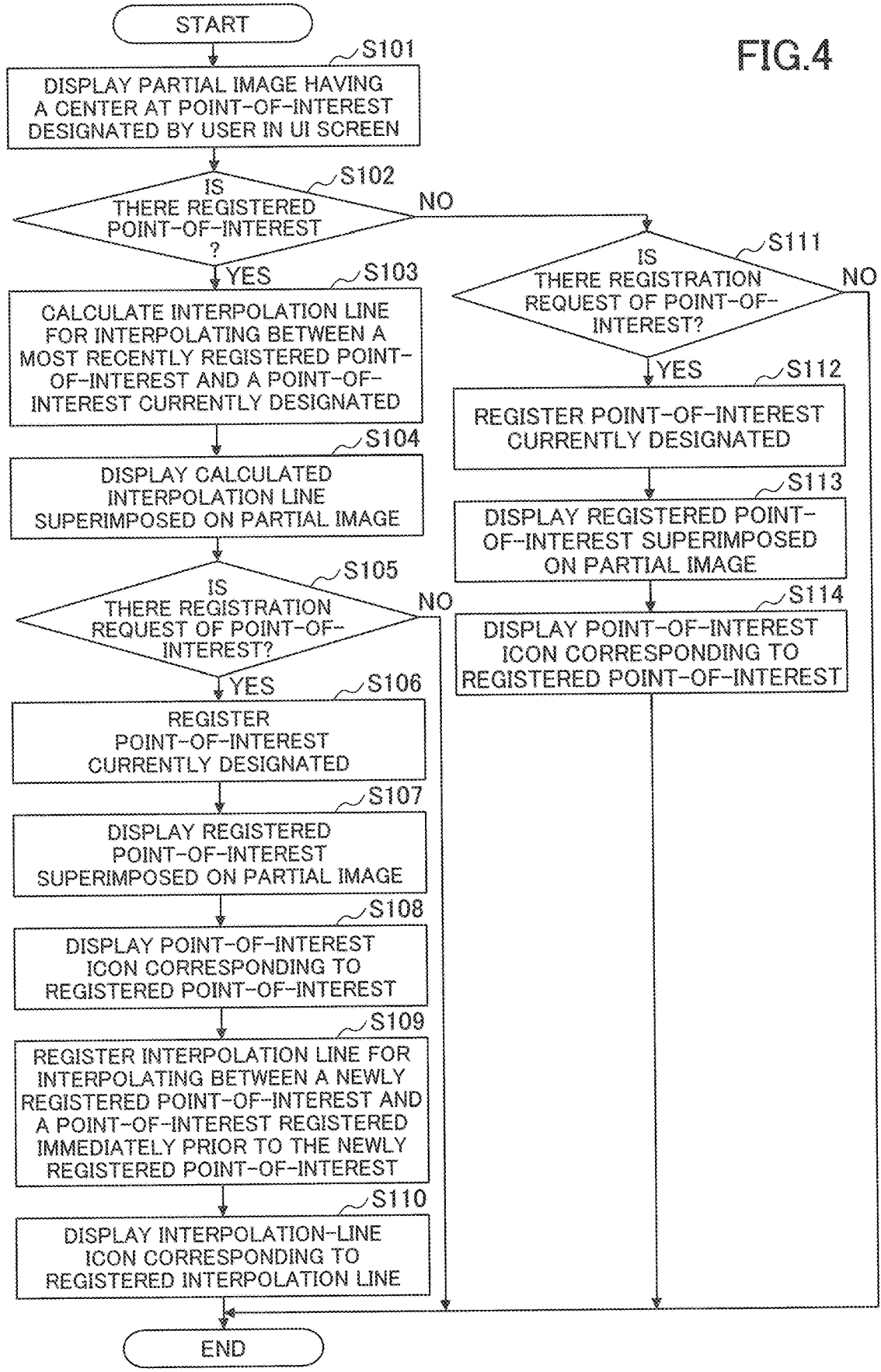
FIG. 4 is a flowchart of an example of processing performed when the point-of-interest is registered.

Next, explanation will be provided below for processing performed in registering the point-of-interest with reference to a flowchart illustrated in FIG. 4.

The smartphone 100 displays the UI screen on the touch panel display 18 to repeatedly perform a series of processing to be described below.

First, in step 101, the UI unit 102 displays a partial image (e.g., a partial image having a center at the point-of-interest designated by the user) generated by the partial image generator 103 in the partial-image-displaying region 20 in the UI screen.

In step 102, the point-of-interest registering unit 104 determines whether a registered point-of-interest is present. If a point-of-interest has been not previously registered (No in step 102), the process proceeds to step 111, and then the point-of-interest registering unit 104 monitors a registration request of a point-of-interest. As a result, if a registration request from the user is not made (No in step 111), the process is finished.

On the other hand, if a registration request is made (YES in step 111), the process proceeds to step 112, and then the point-of-interest registering unit 104 registers the point-of-interest currently designated by the user in the point-of-interest management table 500.

FIG. 5A illustrates the point-of-interest management table 500 stored in the storage area 110. As illustrated in FIG. 5A, the point-of-interest management table 500 includes fields with respect to 3D coordinates (x, y, z) with respect to points-of-interest, elevation angles and azimuth angles for defining points-of-interest, and color information (R, G, B, and A) of objects indicating points-of-interest. In step 112, the point-of-interest registering unit 104 registers, in the point-of-interest management table 500, an elevation angle and an azimuth angle with respect to the point-of-interest designated in receiving a registration request from the user, and 3D coordinates (x, y, z) on the 360-degree image. The 3D coordinates are obtained calculated based on the elevation angle and the azimuth angle. The color information is described hereafter.

In step 113, the UI unit 102 displays an object indicating the point-of-interest registered in the point-of-interest management table 500 to be superimposed on the partial image in the partial-image-displaying region 20. In step 114, the UI unit 102 displays a point-of-interest icon corresponding to the registered point-of-interest in the icon-displaying region 30. The process is then finished.

On the other hand, as a result of the determination in step 102, if at least one point-of-interest is registered in the point-of-interest management table 500 (YES in step 102), the process proceeds to step 103. In step 103, the interpolation-line calculator 105 calculates an interpolation line for interpolating between a most recently registered point-of-interest and the point-of-interest currently designated by the user, among the points-of-interest previously registered. In step 104, the UI unit 102 displays the calculated interpolation line superimposed on the partial image. The processing of calculating the interpolation line is described in detail below.

In step 105, the point-of-interest registering unit 104 monitors a registration request of a point-of-interest. If a registration request from the user is not made (No in step 105), the process is finished. On the other hand, if a registration request from the user is made (YES in step 105), the process proceeds to step 106. In step 106, the point-of-interest registering unit 104 registers the point-of-interest currently designated by the user in the point-of-interest management table 500.

In step 107, the UI unit 102 displays the point-of-interest registered in step 106 superimposed on the partial image. In step 108, the UI unit 102 displays a point-of-interest icon corresponding to the registered point-of-interest in the icon-displaying region 30.

In step 109, the interpolation-line registering unit 106 registers, in the interpolation-line management table 600 stored in the storage area 110, an interpolation line (e.g., an interpolation line calculated in newly registering a point-of-interest) for interpolating between a newly registered point-of-interest and a point-of-interest registered immediately prior to the newly registered point-of-interest. The processing of registering the interpolation line is described in detail below.

In step 110, the UI unit 102 displays, in the icon-displaying region 30, interpolation-line icons corresponding to the interpolation lines registered in step 109 in order of registering the interpolation lines. The process is then finished.

With reference to FIGS. 6A through 6D, explanation will be provided for a state transition of the UI screen presented when the point-of-interest is registered.

Figure 6D:
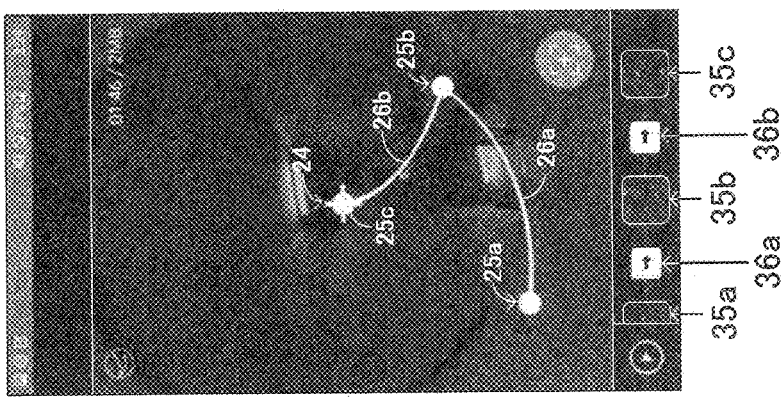
FIGS. 6A to 6D are diagrams illustrating an example of a state transition of a UI screen presented when the point-of-interest is registered.
Figure 6C:
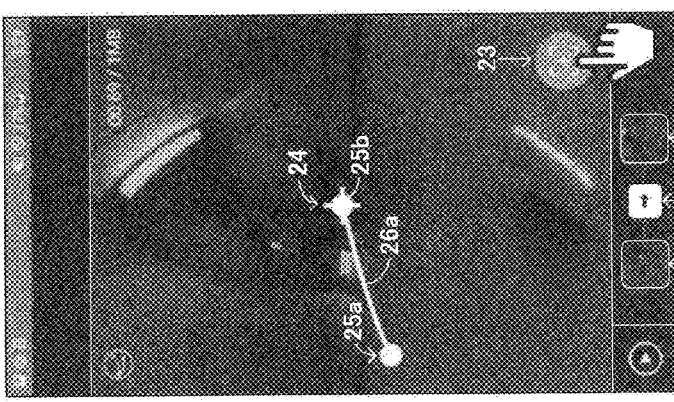

In a case where there is no point-of-interest previously registered, when the user taps the button 23, a position (e.g., a position of the cross-hair cursor 24) designated at the time by the user is registered as a first point-of-interest. In this case, as illustrated in FIG. 6A, an object 25a indicating the registered point-of-interest is displayed on the partial image to be superimposed on the cross-hair cursor 24. Further, at the same time, a point-of-interest icon 35a corresponding to the registered point-of-interest 25a is displayed in the icon-displaying region 30. It is noted that in the present embodiment, the point-of-interest icon 35a is displayed as a thumbnail image of the partial image having a center at the registered point-of-interest 25a (Hereafter, point-of-interest icons are displayed in a similar way).

Figure 6B:
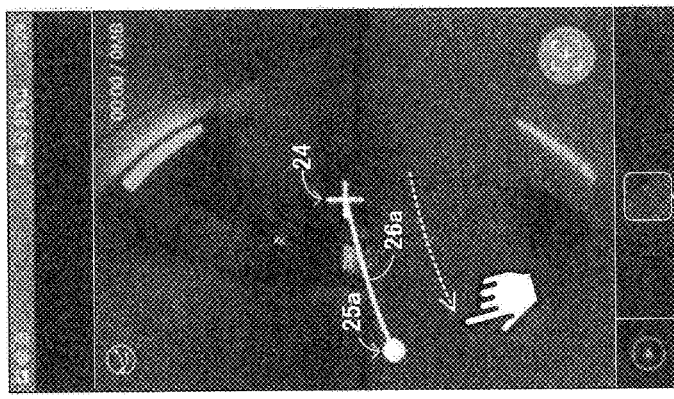
Figure 6A:
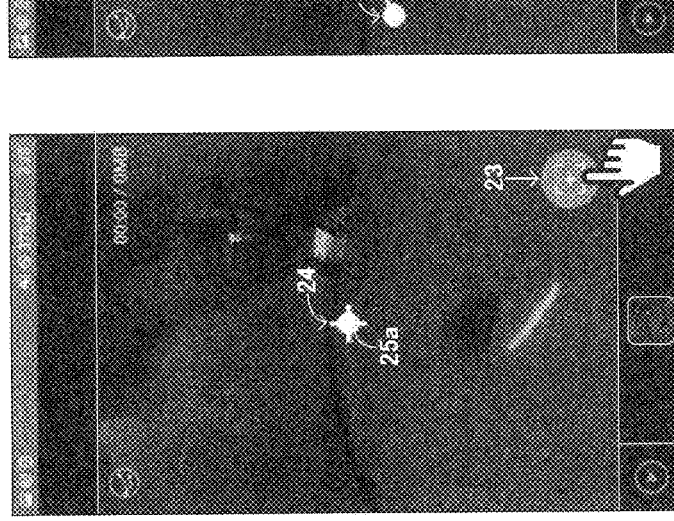

As illustrated in a state from FIG. 6A to FIG. 6B, in a case where the user swipes the partial-image-displaying region 20 in a dashed-arrow direction, 3D coordinates of the designated point-of-interest are changed accordingly. In this case, the object 25a is relatively away from the cross-hair cursor 24 according to a user's swipe operation. As a result, an object 26a indicating an interpolation line, which starts from the cross-hair cursor 24 and ends at the object 25a, is displayed to be superimposed on the partial image.

In the state of FIG. 6B, when the user taps the button 23, a position of the cross-hair cursor 24 at the time is registered as a second point-of-interest. In this case, as illustrated in FIG. 6C, an object 25b indicating the second registered point-of-interest is displayed on the partial image to be superimposed on the cross-hair cursor 24. In addition, a point-of-interest icon 35b corresponding to the second registered point-of-interest 25b is displayed on the right of the point-of-interest icon 35a.

In addition, in this case, an interpolation line 26a for interpolating between the second registered point-of-interest 25b and the first registered point-of-interest 25a is registered. Further, at this time, as illustrated in FIG. 6C, an interpolation-line icon 36a corresponding to the registered interpolation line 26a is displayed between the point-of-interest icon 35a and the point-of-interest icon 35b.

FIG. 6D illustrates the UI screen presented when a third point-of-interest following the point-of-interest 25b is registered. As illustrated in FIG. 6D, an object 25c indicating the third registered point-of-interest is displayed on the partial image to be superimposed on the cross-hair cursor 24. In addition, a point-of-interest icon 35c corresponding to the third registered point-of-interest 25c is displayed on the right of the point-of-interest icon 35b.

In addition, at this time, an interpolation line 26b for interpolating between the third registered point-of-interest 25c and the point-of-interest 25b registered immediately prior to the third registered point-of-interest 25c is registered. Further, as illustrated in FIG. 6D, an interpolation-line icon 36b corresponding to the registered interpolation line 26b is displayed between the point-of-interest icon 35b and the point-of-interest icon 35c.

Figure 7:
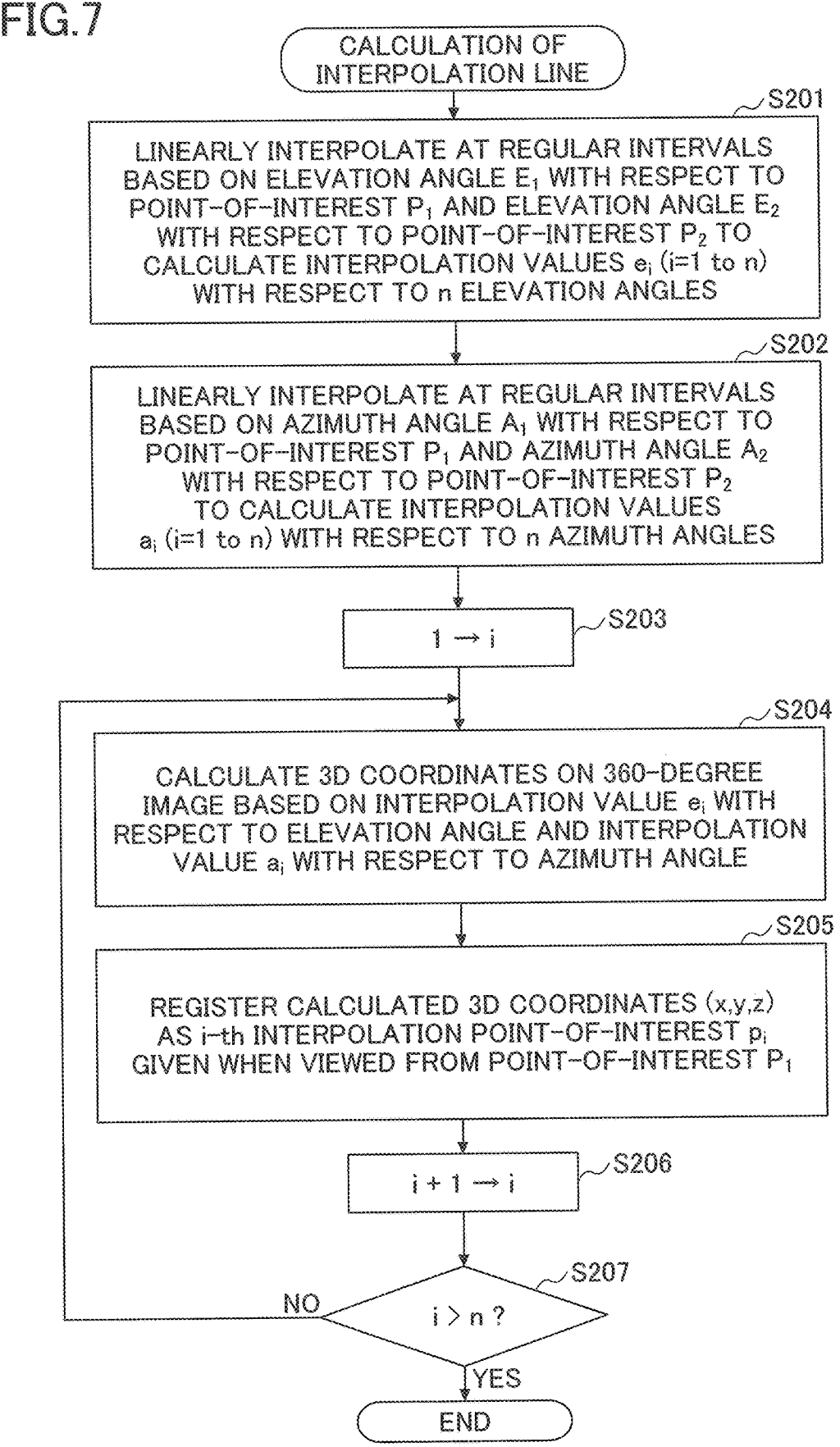
FIG. 7 is a flowchart illustrating an example of processing of calculating an interpolation line.
Figure 8A:
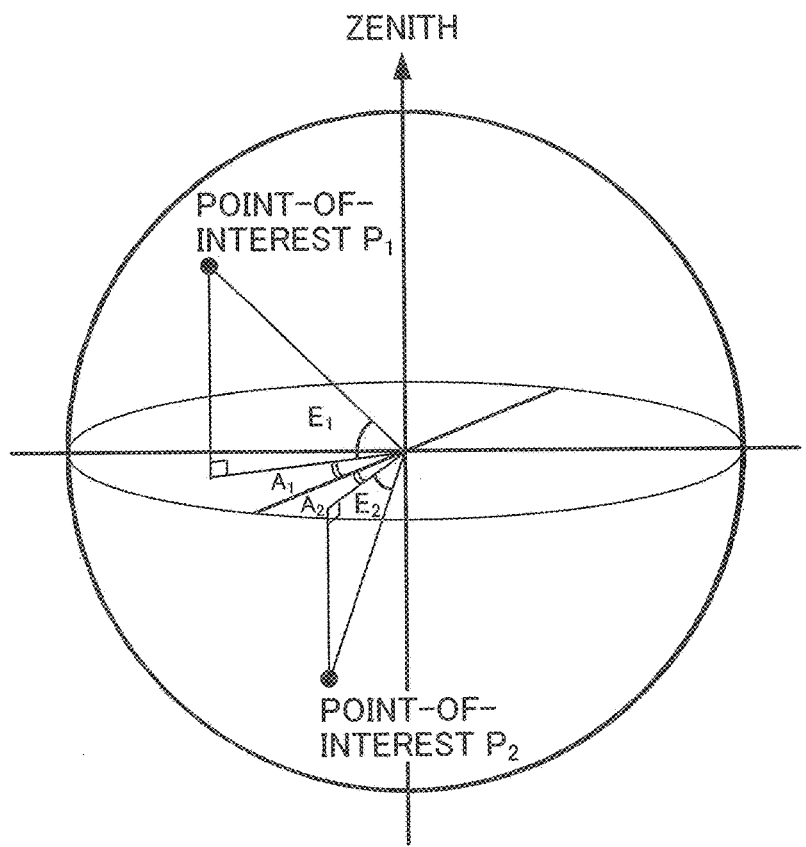
FIGS. 8A and 8B are diagrams for explaining the processing of calculating the interpolation line.

Hereafter, with reference to a flowchart illustrated in FIG. 7, explanation will be provided for processing of calculating the interpolation line for interpolating between two points-of-interest. It is noted that a 3D model of the 360-degree image as illustrated in FIG. 8A is used as a reference.

First, in step 201, given that a total elevation angle obtained based on an elevation angle $E_1$ with respect to a point-of-interest $P_1$ and an elevation angle $E_2$ with respect to a point-of-interest $P_2$ is linearly interpolated at regular intervals, interpolation values ei (i=1~n) with respect to n (n is an integer of one or more hereafter) elevation angles are calculated.

In step 202, given that a total azimuth angle obtained based on an azimuth angle $A_1$ with respect to the point-of-interest $P_1$ and an azimuth angle $A_2$ with respect to the point-of-interest $P_2$ is linearly interpolated at regular intervals, interpolation values ai (i=1~n) with respect to n azimuth angles are calculated.

In step 203, a value of a counter i indicating an order of an interpolation value that is given when viewed from the point-of-interest $P_1$ is set to an initial value (e.g., 1).

In step 204, 3D coordinates on the 3D model of the 360-degree image are calculated based on interpolation values ei with respect to the elevation angles and the interpolation values ai with respect to the azimuth angles.

In step 205, as i-th interpolation point-of-interest pi given when viewed from the point-of-interest $P_1$, the 3D coordinates (x,y,z) calculated in step 204 are registered in the interpolation-line management table 600. FIG. 5B illustrates the interpolation-line management table 600 in which an interpolation-point-of-interest p is registered. As illustrated in FIG. 5B, the interpolation-line management table 600 includes fields with respect to 3D coordinates (x,y,z) of interpolation-points-of-interest p, and color information (R, G, B, and A) of objects indicating interpolation lines.

In step 206, the value of the counter i is incremented by one.

The processes of steps 204 through 206 are repeatedly performed until the value of the counter i exceeds n (No in step 207). If the value of the counter i exceeds n (YES in step 207), the process is finished.

Figure 8B:
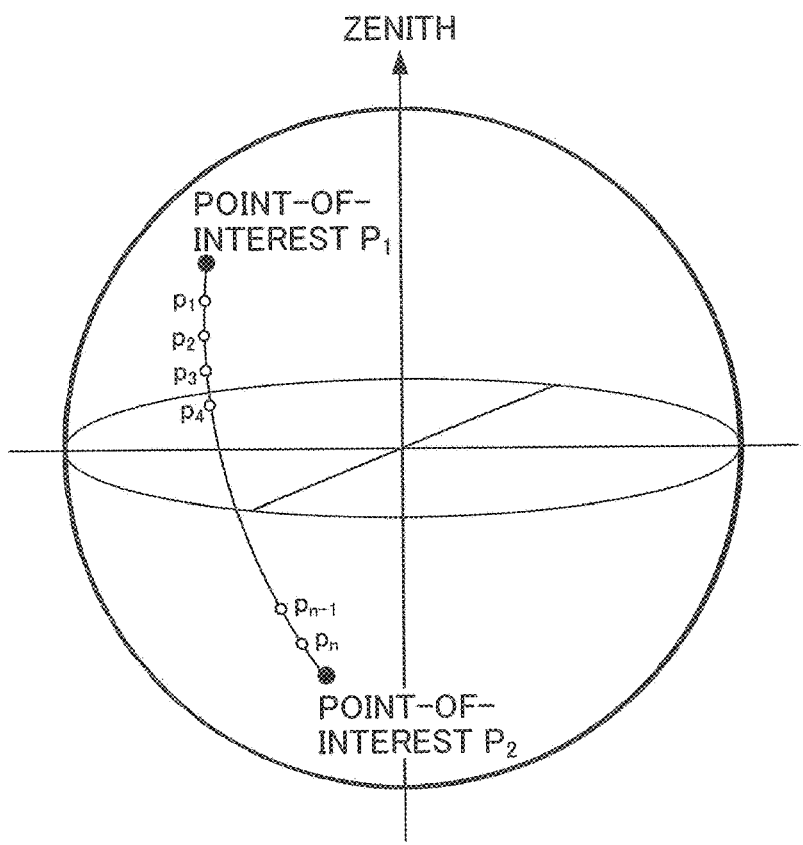

At a point at which the series of processing described above is finished, n interpolation-points-of-interest p, as illustrated in FIG. 8B, are registered in the interpolation-line management table 600. In the present embodiment, for each interpolation line, one interpolation-line management table 600 is created. An object indicating the interpolation line is generated based on the n interpolation-points-of-interest p registered in the corresponding interpolation-line management table 600.

Figure 9:
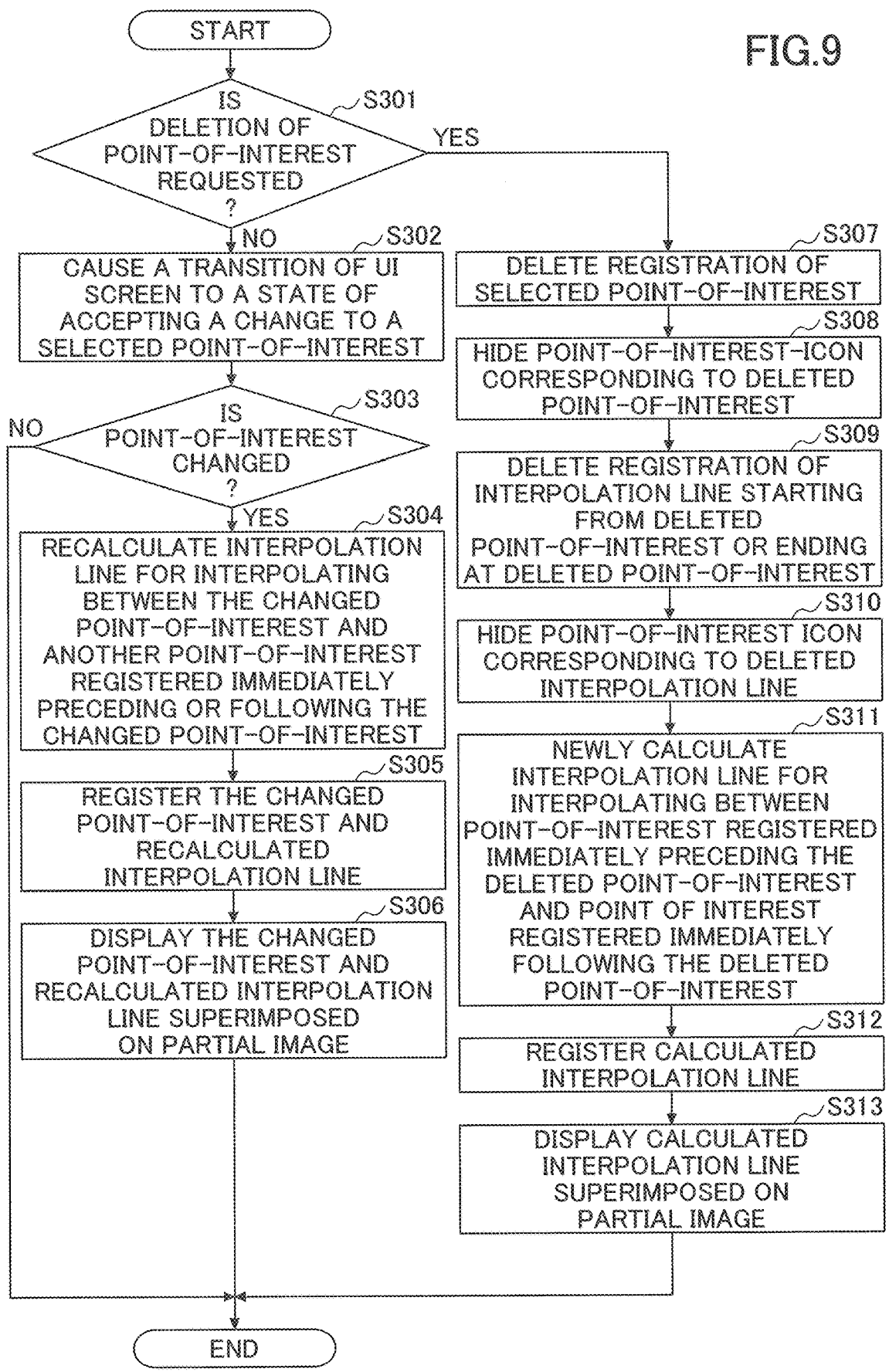
FIG. 9 is a flowchart illustrating an example of processing performed when a point-of-interest icon is selected.

Hereafter, with reference to a flowchart illustrated in FIG. 9, explanation will be provided for processing performed when the point-of-interest icon displayed in the icon-displaying region 30 is selected.

In step 301, the UI unit 102 that has detected a user's selection of a point-of-interest icon determines whether the user requests to delete a point-of-interest. As a result, if the user does not request to delete a point-of-interest (No in step 301), the process proceeds to step 302, and then the UI unit 102 causes a transition of the partial-image-displaying region 20 in the UI screen to a state of accepting a change to a point-of-interest corresponding to the point-of-interest icon selected by the user.

In step 303, the UI unit 102 stands ready for accepting a change to a point-of-interest by the user within a predetermined time. As a result, in the case of timeout (No in step 303) caused by a case where the user does not change a point-of-interest, the process is finished. In contrast, if the user changes a point-of-interest (YES in step 303), the process proceeds to step 304.

In step 304, the interpolation-line calculator 105 recalculates an interpolation line for interpolating between the changed point-of-interest and another point-of-interest registered immediately preceding or following the changed point-of-interest. In step 305, the interpolation-line registering unit 106 registers the recalculated interpolation line in the interpolation-line management table 600.

In step 306, the UI unit 102 displays the changed point-of-interest and the recalculated interpolation line superimposed on the partial image. The process is then completed.

Figure 10C:
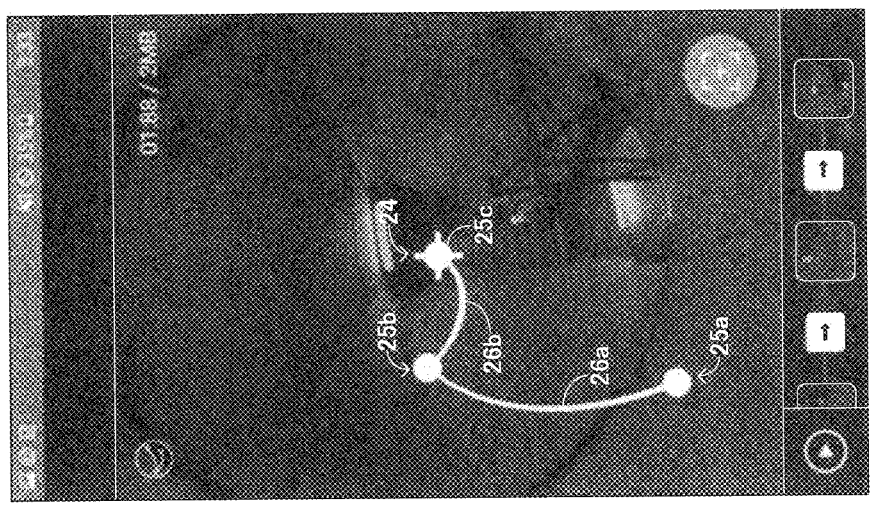
FIGS. 10A to 10C are diagrams illustrating an example of a state transition of a UI screen presented when the point-of-interest is changed.
Figure 10B:
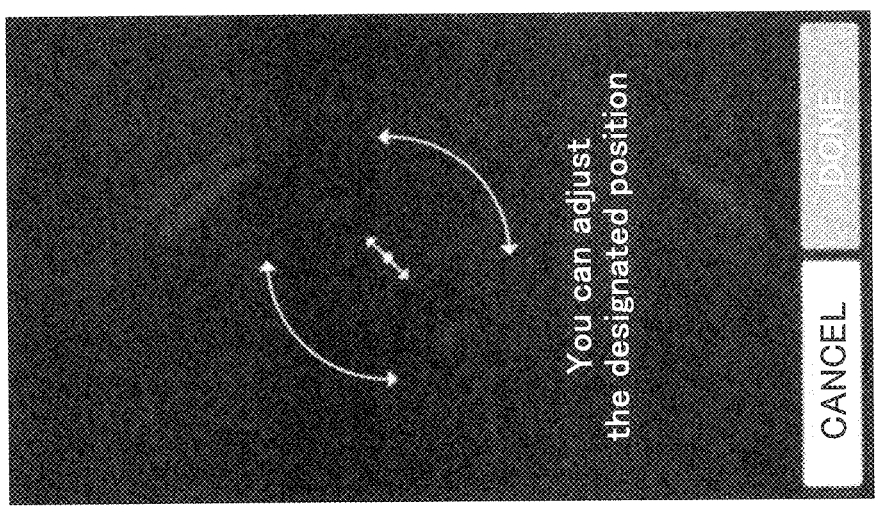
Figure 10A:
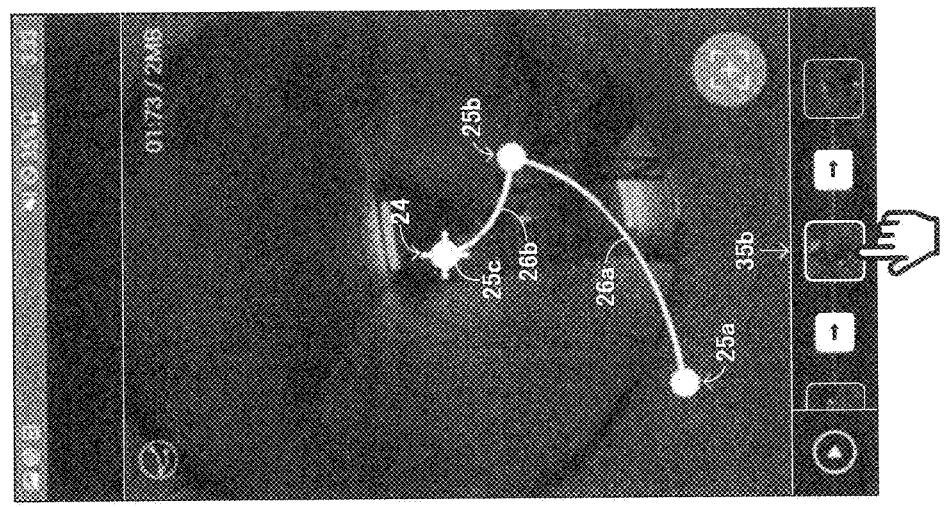

Hereafter, with reference to FIGS. 10A through 10C, explanation will be provided for a state transition of a UI screen presented when the user changes a point-of-interest.

FIG. 10A illustrates a UI screen in which three points-of-interest (25a, 25b, and 25c) are registered. In this state, when the user taps a point-of-interest icon 35b corresponding to the second registered point-of-interest 25b, the UI screen transitions to a state as illustrated in FIG. 10B to accept a change to a position of the point-of-interest 25b corresponding to the tapped point-of-interest icon 35b. In response to the change, the user changes the position of the second point-of-interest 25b into any position.

FIG. 10C illustrates a UI screen presented after the user changes the position of the second point-of-interest 25b. In this case, in association with the change to the location of the point-of-interest 25b, 3D coordinates of the point-of-interest 25b in the point-of-interest management table 500 are changed. Also, an interpolation line 26a for interpolating between the point-of-interest 25b and the point-of-interest 25a as well as an interpolation line 26b for interpolating between the point-of-interest 25b and the point-of-interest 25c are recalculated. The content of the interpolation-line management table 600 corresponding to each interpolation line is accordingly updated based on the recalculated result.

Referring back to FIG. 9, explanation will be provided.

As a result of the determination in step 301, if the user who has selected a point-of-interest icon requests to delete a point-of-interest (YES in step 301), the process proceeds to step 307. In step 307, the point-of-interest registering unit 104 deletes the registered point-of-interest corresponding to the point-of-interest icon selected by the user, from the point-of-interest management table 500. In step 308, the UI unit 102 hides the point-of-interest icon corresponding to the deleted point-of-interest.

In step 309, the interpolation-line registering unit 106 deletes the registered interpolation line that starts from the deleted interpolation line or ends at the deleted interpolation line, from the interpolation-line management table 600. In step 310, the UI unit 102 hides the interpolation-line icon corresponding to the deleted interpolation line.

In step 311, the interpolation-line calculator 105 newly calculates an interpolation line for interpolating between a registered point-of-interest immediately preceding the deleted point-of-interest and a registered point-of-interest immediately following the deleted point-of-interest.

In step 312, the interpolation-line registering unit 106 registers the newly calculated interpolation line in the interpolation-line management table 600. In step 313, the UI unit 102 displays the newly calculated interpolation line superimposed on the partial image. The process is then finished.

It is noted that in a case where the point-of-interest deleted in step 307 is the last point-of-interest, the process is finished followed by steps 308 through 310, without executing steps 311 through 313.

Figure 11B:
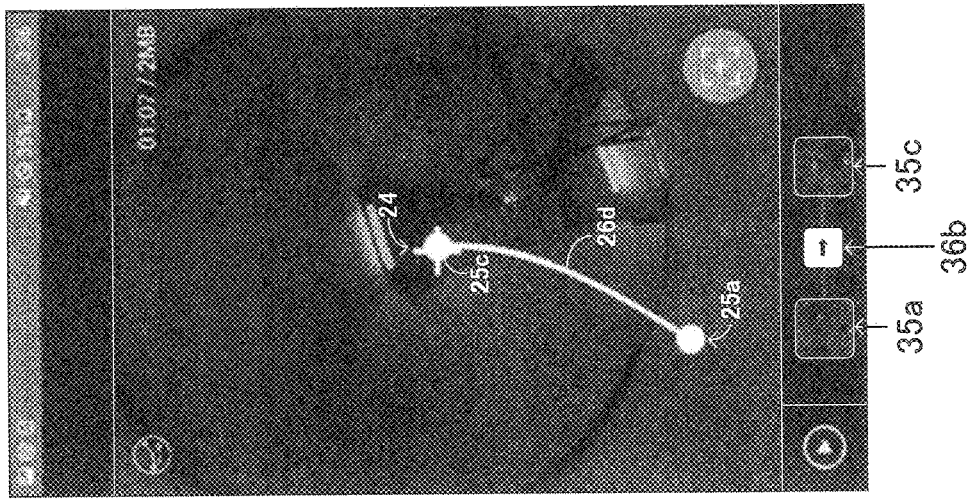
FIGS. 11A and 11B are diagrams illustrating an example of a state transition of a UI screen presented when the point-of-interest is deleted.
Figure 11A:
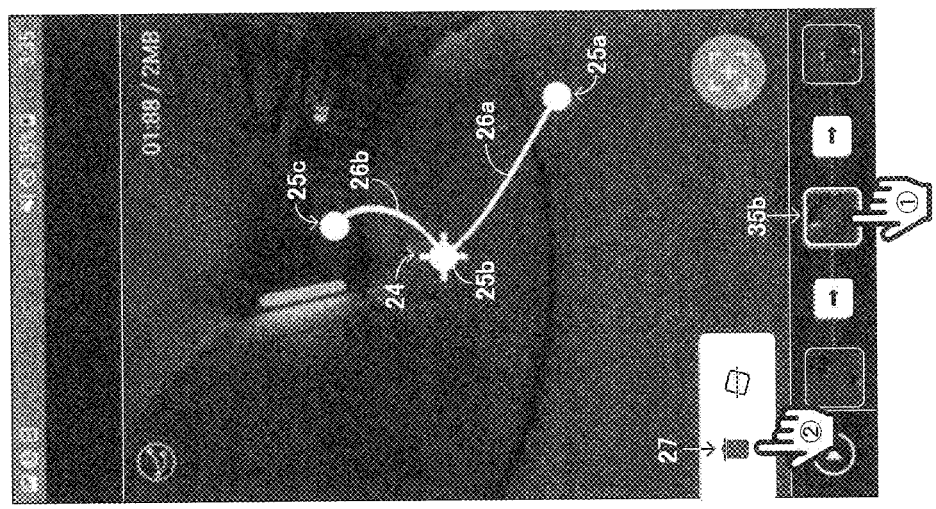

Hereafter, with reference to FIGS. 11A and 11B, explanation will be provided for a state transition of a UI screen presented when a point-of-interest is deleted.

FIG. 11A illustrates a UI screen in which three points-of-interest (25a, 25b, and 25c) are registered. In this state, when the user who has tapped the point-of-interest icon 35b corresponding to the second registered point-of-interest 25b taps a trash icon 27, the UI screen transitions to a state as illustrated in FIG. 11B.

In this case, the registered point-of-interest 25b is deleted in the point-of-interest management table 500. Further, a new interpolation line 26d for interpolating between the point-of-interest 25a and the point-of-interest 25c is newly calculated, and then the calculated result is registered in the interpolation-line management table 600. The new interpolation line 26d is displayed to be superimposed on the partial image.

Figure 12:
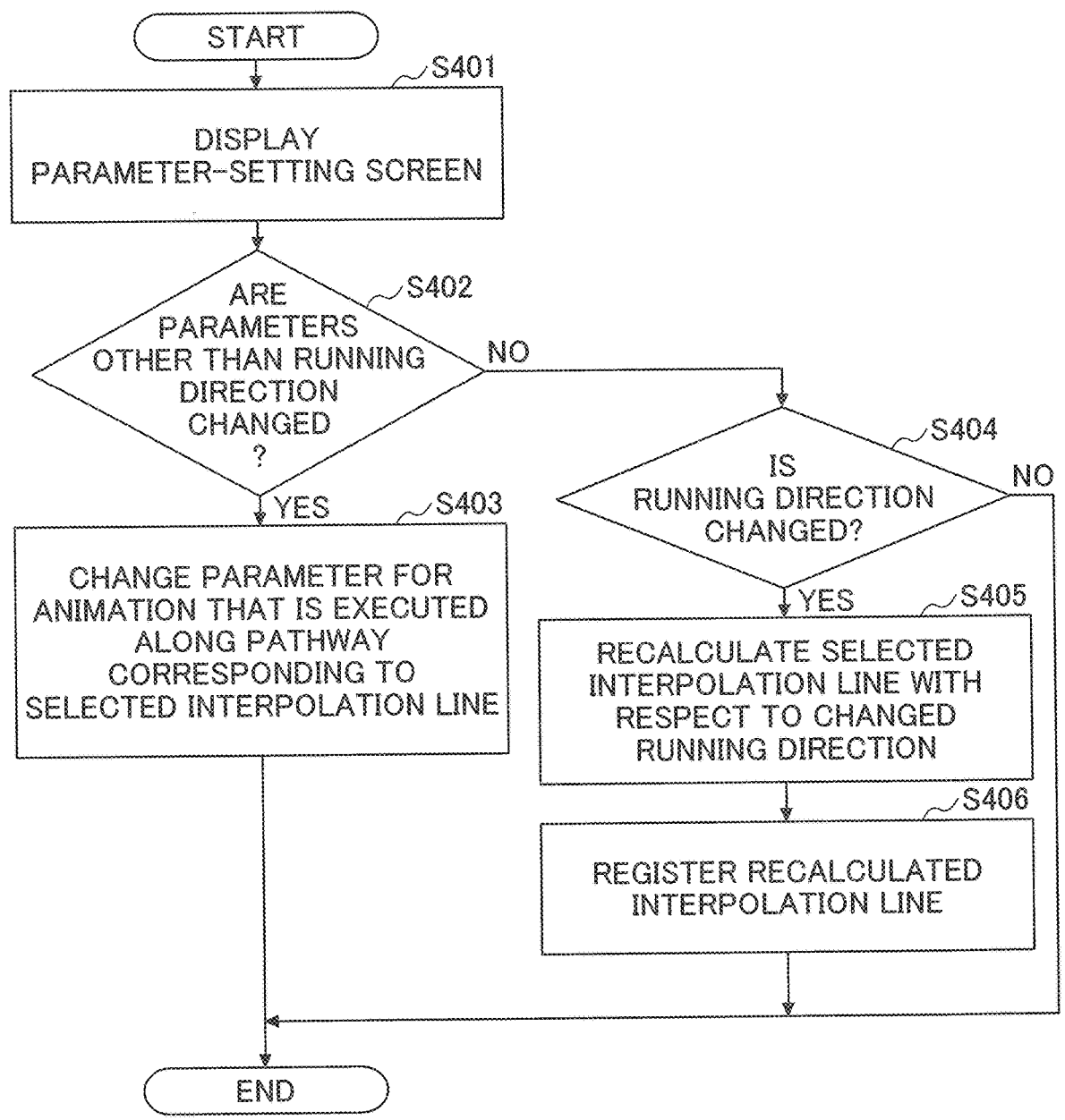
FIG. 12 is a flowchart illustrating an example of processing performed when an interpolation-line icon is selected.

Hereafter, with reference to a flowchart illustrated in FIG. 12, explanation will be provided for processing performed when an interpolation line icon is selected.

In response to selecting, by the user, an interpolation line icon, in step 401, the UI unit 102 displays a parameter-setting screen.

Figure 13B:
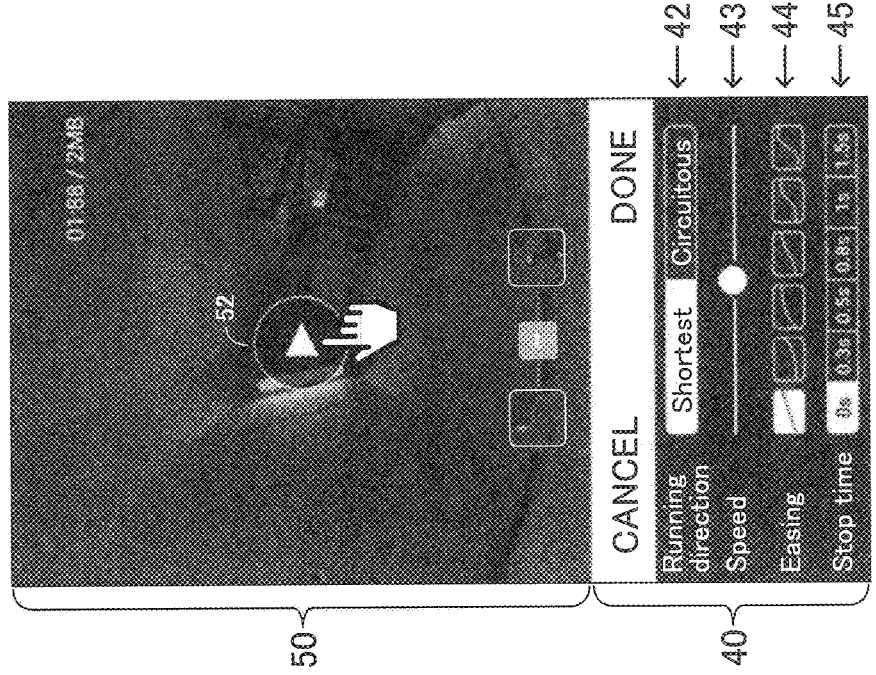
FIGS. 13A and 13B are diagrams illustrating an example of a state transition of a UI screen presented when the interpolation-line icon is selected.
Figure 13A:
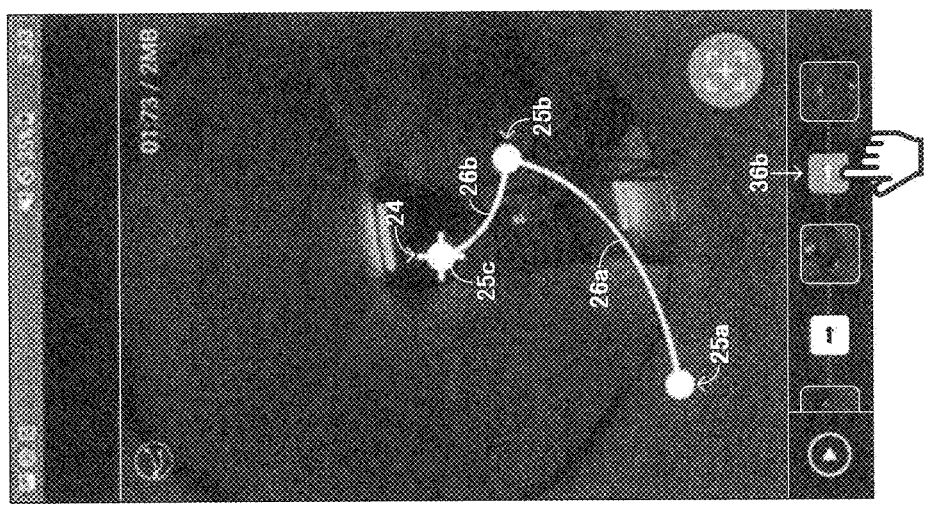

FIGS. 13A and 13B illustrate a UI screen presented when the user selects an interpolation-line icon. As illustrated in FIG. 13A, when the user taps an interpolation-line icon 36b, the UI screen transitions to the parameter-setting screen as illustrated in FIG. 13B.

As illustrated in FIG. 13B, the parameter-setting screen includes a parameter-setting region 40 and a preview-displaying region 50. In the parameter-setting region 40, the following is displayed: buttons 42 for selecting a running direction (shortest/circuitous), a slider 43 for setting a speed, buttons 44 for selecting an easing curve, and buttons 45 for selecting a stop time. Tapping any of the buttons 42 enables to select a running direction, or alternatively, operating the slider 43 enables to select a speed. Tapping any of the buttons 44 enables to select an easing curve, or alternatively, tapping any of the buttons 45 enables to select a stop time.

The running direction means a moving direction of a point-of-interest in executing an animation. The speed means a moving speed of a point-of-interest. The easing curve means a curve indicative of a time change in acceleration of a moving point-of-interest. The stop time means a time (e.g., a time to stop an animation) at which a point-of-interest stops at each of registered points.

Referring back to FIG. 12, explanation will be provided.

In step 402, the UI unit 102 that has displayed the parameter-setting screen determines whether the user changes parameter(s) (speed, easing curve, stop time) other than a running direction via the parameter-setting screen. If the user changes parameter(s) other than a running direction (YES in step 402), the process proceeds to step 403.

In step 403, among three types of parameters (speed, easing curve, and stop time) relating to an animation executed along a pathway corresponding to an interpolation line that corresponds to the interpolation-line icon selected by the user, the UI unit 102 changes value(s) of the parameter(s) selected by the user into the value(s) selected by the user. The process is then finished.

On the other hand, as a result of the determination in step 402, if the user changes the running direction (from NO in step 402 to YES in step 404), the process proceeds to step 405. It is noted that in the case of timeout (from NO in step 402 to NO in step 404) caused by a case where the user does not request to change any parameter within a predetermined period, the process is finished.

In step 405, the interpolation-line calculator 105 recalculates an interpolation line corresponding to the interpolation-line icon selected by the user, with respect to the running direction selected by the user. For example, in a case where the user operates the buttons 42 to change the running direction of "shortest" into "circuitous", the interpolation-line calculator 105 recalculates an interpolation line such that a pathway from a starting point to an end point of the interpolation line corresponding to the interpolation-line icon selected by the user can be the longest. In step 406, the interpolation-line registering unit 106 registers the recalculated interpolation line in the interpolation-line management table 600, and then the process is finished.

Figure 14B:
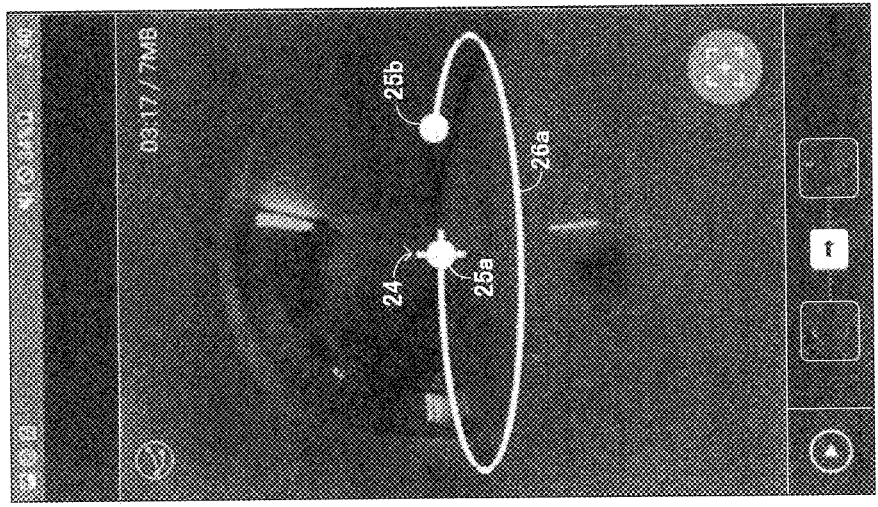
FIGS. 14A and 14B are diagrams illustrating an example of a UI screen presented when a running direction is changed.
Figure 14A:
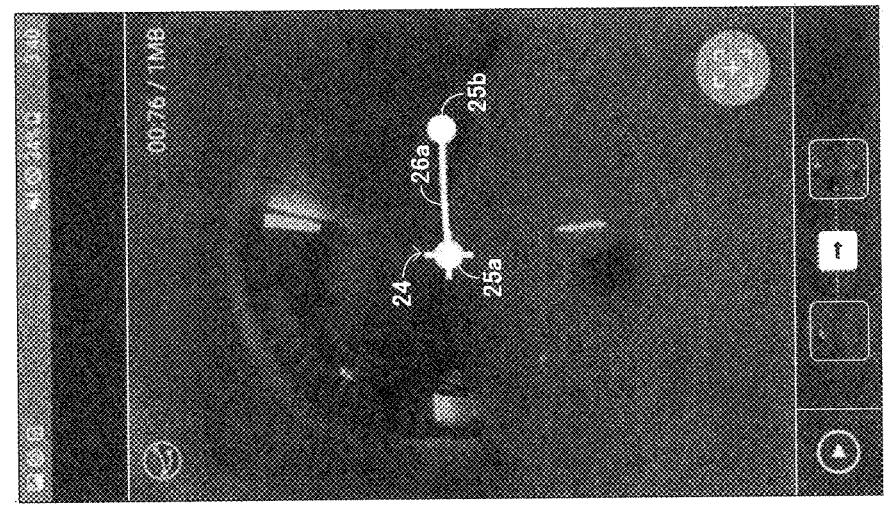

FIG. 14A illustrates a UI screen in which two points-of-interest 25a and 25b are registered. In this state, in a case where the running direction of "shortest" is changed into "circuitous" in the manner describe above, the UI screen transitions to a state as illustrated in FIG. 14B.

It is noted that in the present embodiment, when the user taps the replay button 52 displayed in the preview-displaying region 50, the animation executing unit 108 executes an animation along a pathway corresponding to the interpolation line that corresponds to the interpolation-line icon selected by the user. The UI unit 102 displays the animation in the preview-displaying region 50. Such a preview replay allows the user to check if a change to parameter(s) leads to an animation as intended.

Figure 15B:
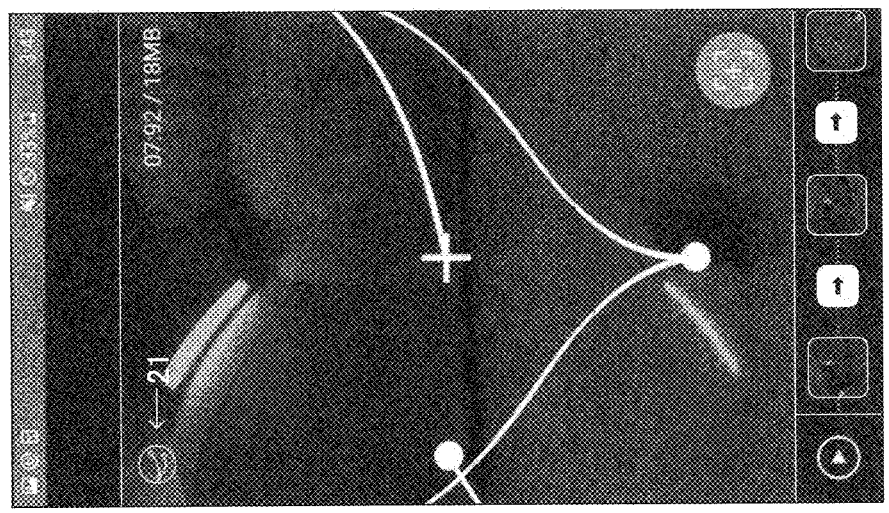
FIGS. 15A and 15B are diagrams illustrating an example of a UI screen presented when display modes are switched.
Figure 15A:

Hereafter, the functions of the button 21 described in FIG. 1 are described. In the present embodiment, by tapping the button 21, various objects (the point-of-interest 25, the interpolation line 26, and the cross-hair cursor 24) to be displayed and superimposed on the partial image can be switched between displaying and hiding. FIG. 15A illustrates a UI screen presented when a display mode is selected. FIG. 15B illustrates a UI screen presented when a non-display mode is selected.

As described above, in the present embodiment, the user registers any point-of-interest on the 360-degree image via the UI screen provided by the UI unit 102. The point-of-interest controller 107 causes a transition of a point-of-interest along a pathway for interpolating with respect to at least two registered points-of-interest. Further, the animation executing unit 108 executes the animation that allows partial images, each of which has a center at a partial-image-specific point-of-interest intended for the transition, to be displayed. In such a way, the area-of-interest of the 360-degree image is presented in an animation manner that is visually recognizable.

In addition, according to the present embodiment, in the UI screen in which the point-of-interest is registered, the point-of-interest and the interpolation line that is a moving path of the point-of-interest are visualized on the partial image. In such an aspect, an entire flow of the animation is intuitively recognizable, thereby easily editing the animation.

It is noted that in the embodiment described above, the registered point-of-interest is represented by ◯, and the interpolation line is represented by a solid line. However, in the present embodiment, the object indicating a registered point-of-interest as well as the object indicating an interpolation line can be represented by other indications.

Also, in the present embodiment, at least two registered points-of-interest displayed may be distinguished. Alternatively, at least two registered interpolation lines displayed may be distinguished. In this case, given that the color information (R, G, B and A) stored in the point-of-interest management table 500 (FIG. 5A) is individually set on a per color basis, each of registered points-of-interest can be assigned by a different color. Also, given that the color information (R, G, B and A) stored in the interpolation-line management table 600 (FIG. 5B) is individually set on a per color basis, each of registered interpolation lines can be assigned by a different color.

Figure 16:
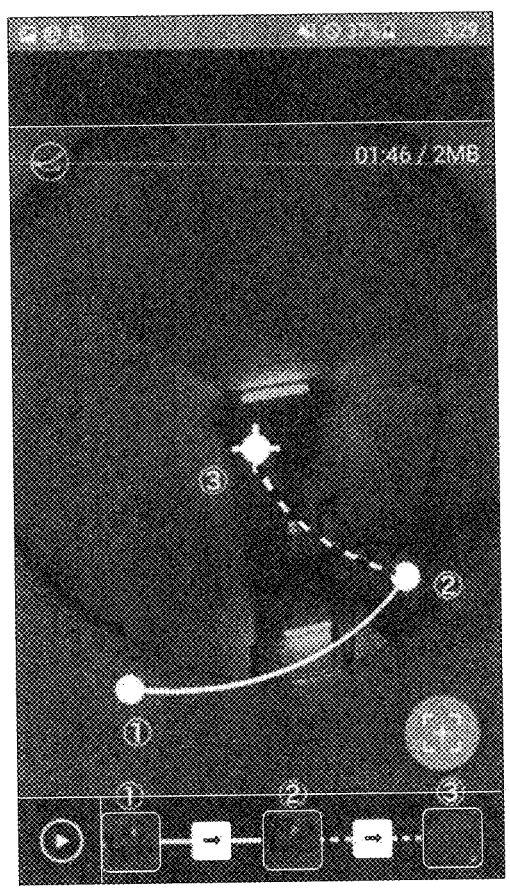
FIG. 16 is a diagram illustrating another display aspect of the UI screen.

Further, in the present embodiment, the registered points-of-interest and point-of-interest icons can be displayed such that correspondences between the registered points-of-interest and the point-of-interest icons are visually recognizable. Also, the registered interpolation lines and interpolation line icons can be displayed such that correspondences between the registered interpolation lines and interpolation line icons are visually recognizable. FIG. 16 illustrates a UI screen in which a registered interpolation line and the corresponding interpolation-line icon are represented by a different indication of objects (a solid line or a dash line), where the same numbers are assigned to the registered point-of-interest and the corresponding point-of-interest icon.

As described above, as the present embodiment of the information processing apparatus for recognizably presenting the area-of-interest of the 360-degree image, explanation has been provided for the case where the animation of the points-of-interest registered by the user is executed. However, aside from this embodiment, another embodiment is described hereafter. In another embodiment, without registering points-of-interest by the user, the points-of-interest automatically are registered using a learning model in which points-of-interest are included in such a way that is suitable for the 360-degree image selected by the user.

Another Embodiment

Figure 17:
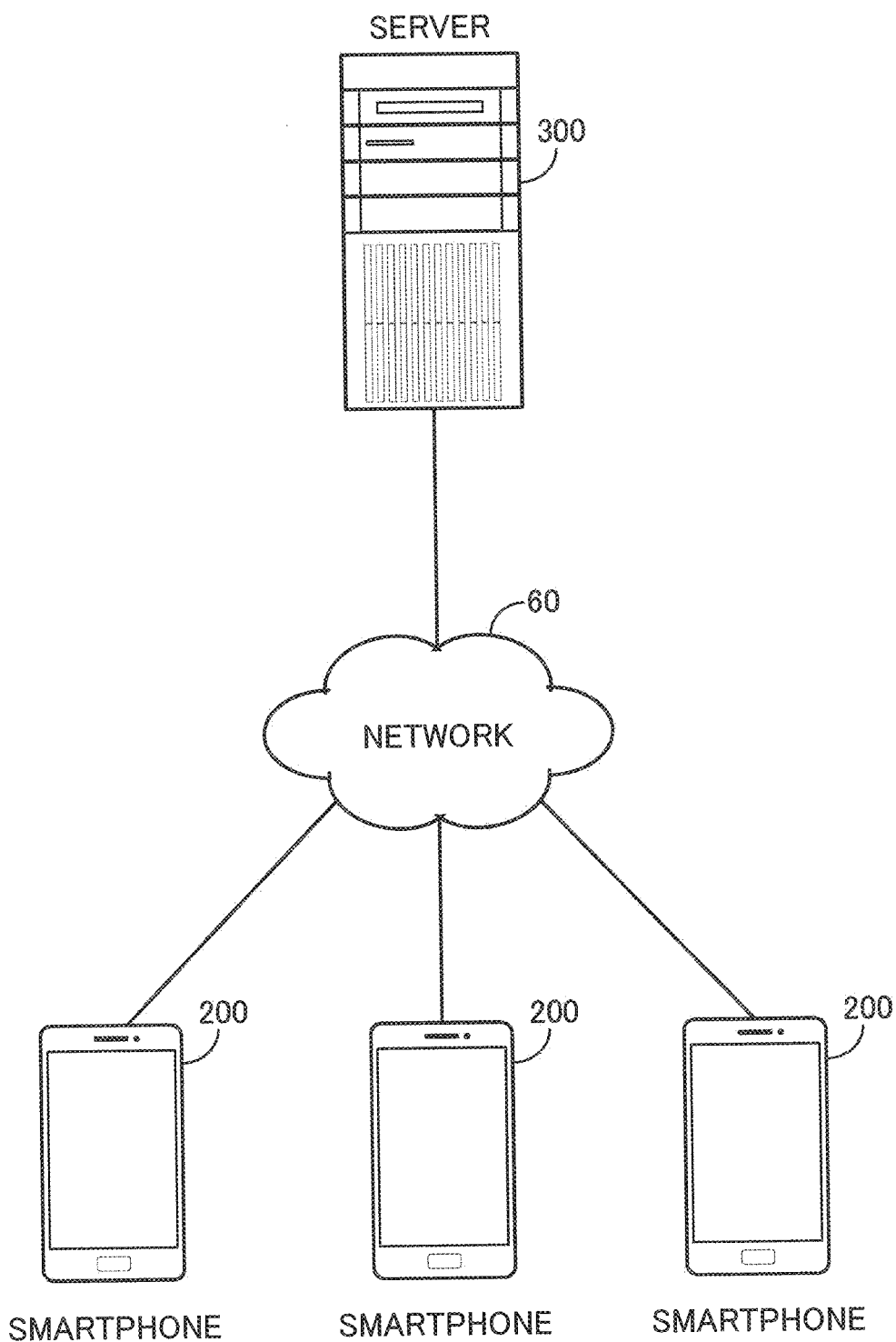
FIG. 17 is a diagram illustrating an example of a network system according to another embodiment.

FIG. 17 illustrates a network system in another embodiment. The network system of the present embodiment includes smartphones 200 and a server 300. Each of the smartphone 200 and the server 300 is communicatively interconnected via a network 60. It is noted that the smartphone 200 is used as an example of the information processing apparatus for displaying 360-degree images.

Figure 18:
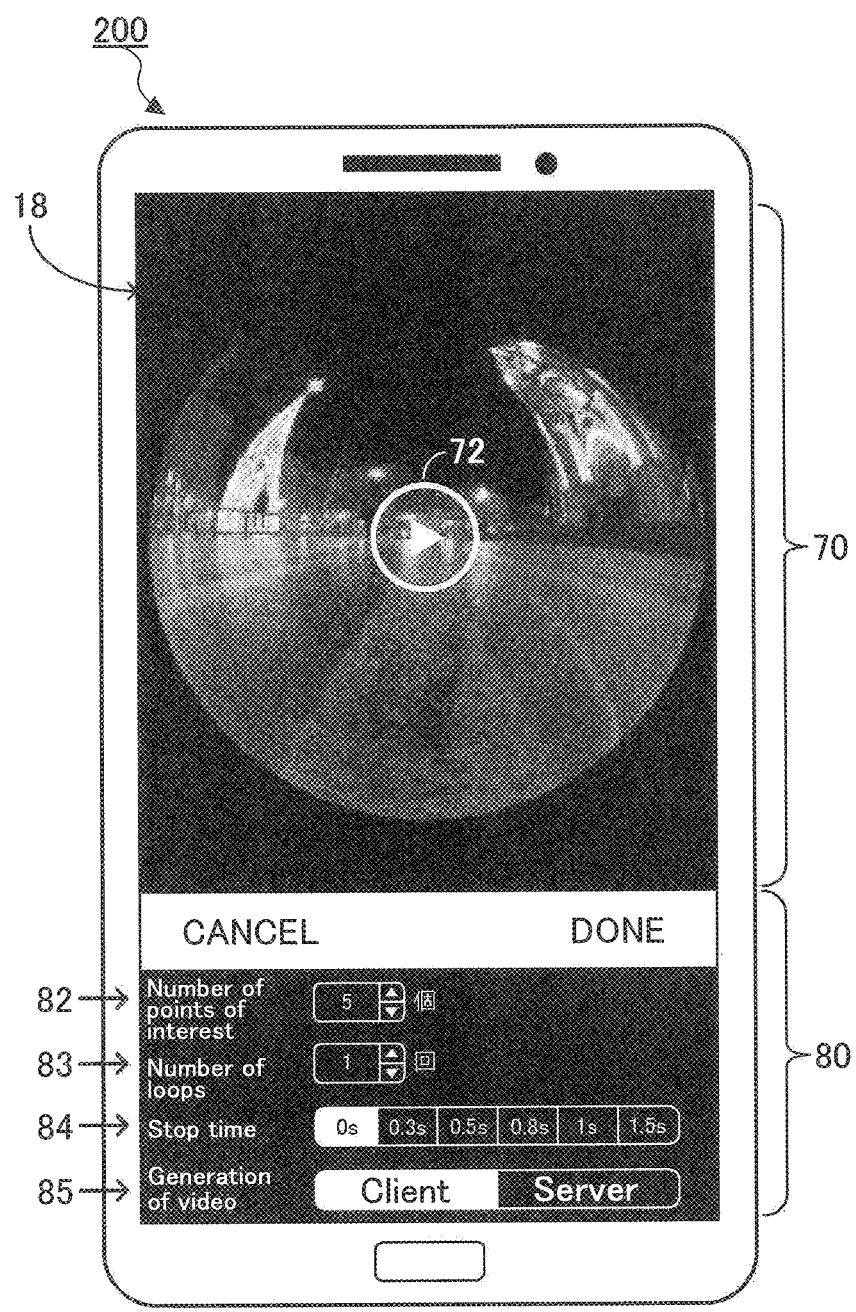
FIG. 18 is a diagram illustrating an example of a smartphone according to another embodiment.

FIG. 18 illustrates the smartphone 200. As illustrated in FIG. 18, on a touch panel display 18 of the smartphone 200, a UI screen for instructing to execute an animation (hereafter a UI screen) is displayed to recognizably present points-of-interest of the 360-degree image.

As illustrated in FIG. 18, the UI screen includes an animation-displaying region 70 and a parameter-setting region 80 for setting an animation-executing condition. In the animation-displaying region 70, a replay button 72 for instructing to execute an animation is displayed. In the parameter-setting region 80, an input box 82 for designating the number of points-of-interest, an input box 83 for designating the number of animation loops, buttons 84 for designating a stop time of an animation at any point-of-interest, and buttons 85 for designating a generation location of moving image data are displayed.

Next, with reference to a functional block diagram illustrated in FIG. 19, explanation will be provided below for a functional configuration of the smartphone 200 and the server 300.

Figure 19:
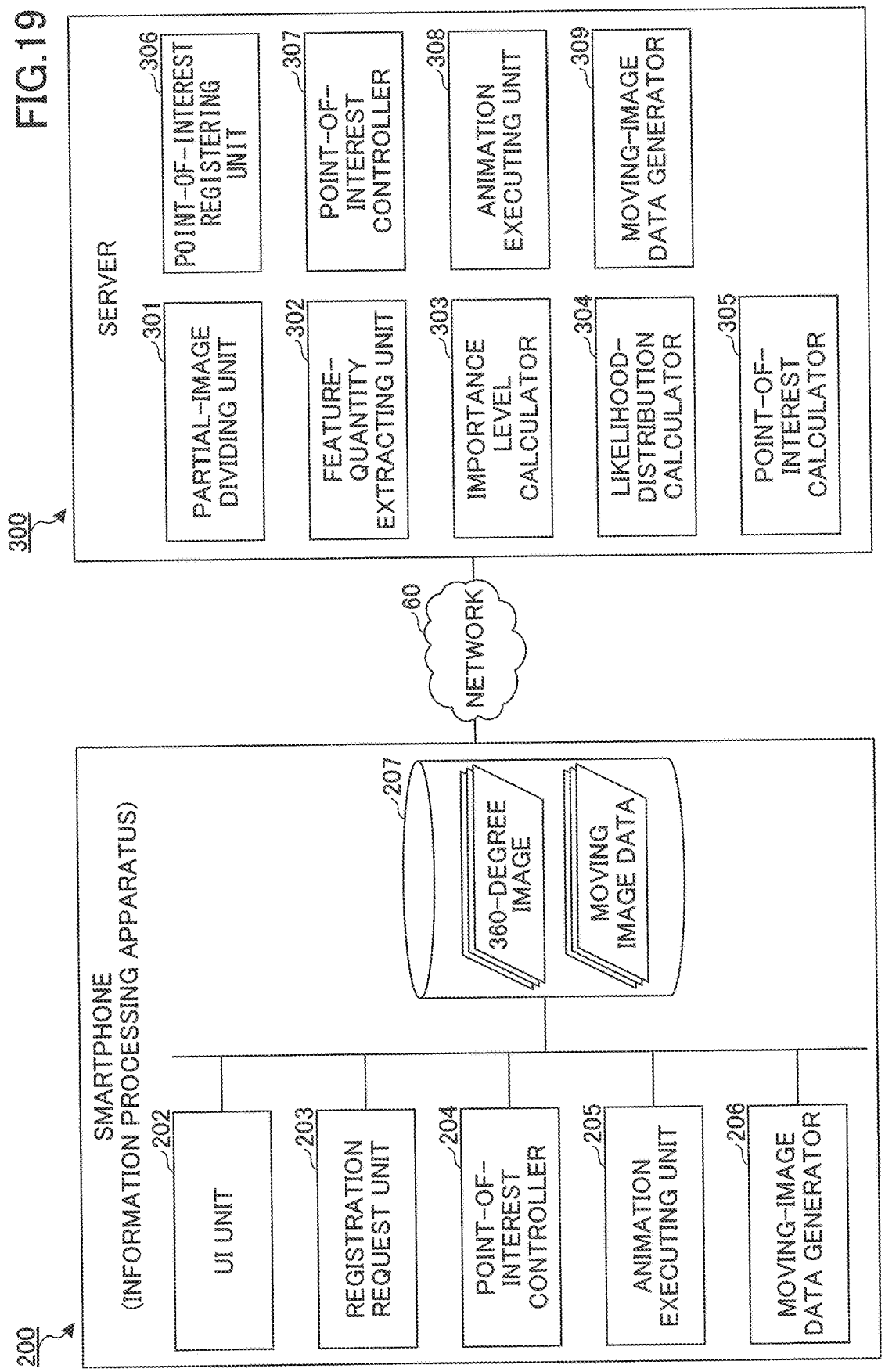
FIG. 19 is an example of a functional block diagram illustrating a smartphone and a server according to another embodiment.

As illustrated in FIG. 19, the smartphone 200 includes a UI unit 202, a registration request unit 203, a point-of-interest controller 204, an animation executing unit 205, a moving-image-data generator 206, and a storage area 207.

The UI unit 202 displays a UI image for receiving an execution of an animation on the touch panel display 18. The UI unit 202 also receives, from the user, a setting of an animation-executing condition as well as an execution instruction of the animation.

In response to receiving an execution instruction of an animation from the user, the registration request unit 203 requests the server 300 to register a point-of-interest.

The point-of-interest controller 204 causes a transition of the point-of-interest along a pathway for interpolating with respect to at least two points-of-interest registered by the server 300.

The animation executing unit 205 executes an animation that allows partial images, each of which has a center at a partial-image-specific point-of-interest intended for the transition, to be displayed in order of transitioning the points-of-interest.

The moving-image-data generator 206 converts the executed animation into a moving image data in a universal file format.

The storage area 207 stores various data.

It is noted in the present embodiment, a computer provided with the smartphone 200 executes the dedicated application to serve as the functions described above.

As illustrated in FIG. 19, the server 300 includes a partial-image dividing unit 301, a feature-quantity extracting unit 302, an important level calculator 303, a likelihood-distribution calculator 304, a point-of-interest calculator 305, a point-of-interest registering unit 306, a point-of-interest controller 307, an animation executing unit 308, and a moving-image data generator 309.

The partial-image dividing unit 301 converts the 360-degree image received from the smartphone 200 into an image in an Equirectangular format (equidistant cylindrical projection). The partial-image dividing unit 301 also reprojects the converted image in multiple different directions to divide the image into multiple partial images.

The feature-quantity extracting unit 302 extracts a feature quantity from each of the partial images.

The important level calculator 303 calculates a level of importance for each position of a given image, from the extracted feature quantity based on a predetermined regression model (learning model).

The likelihood-distribution calculator 304 calculates a likelihood distribution of the point-of-interest based on the calculated level of importance.

The point-of-interest calculator 305 calculates the point-of-interest based on the calculated likelihood distribution of a point-of-interest.

The point-of-interest registering unit 306 registers at least two registered points-of-interest based on at least two points-of-interest calculated by the point-of-interest calculator 305.

The point-of-interest controller 307 causes a transition of the point-of-interest along a pathway for interpolating with respect to the at least two registered points-of-interest registered by the point-of-interest registering unit 306.

The animation executing unit 308 executes an animation that allows partial images, each of which has a center at a partial-image-specific point-of-interest intended for the transition, to be displayed in order of transitioning the points-of-interest.

The moving-image data generator 309 converts the executed animation into a moving image data in a universal file format.

It is noted that in the present embodiment, a computer provided with the server 300 executes a predetermined program to serve as the functions described above.

Figure 20:
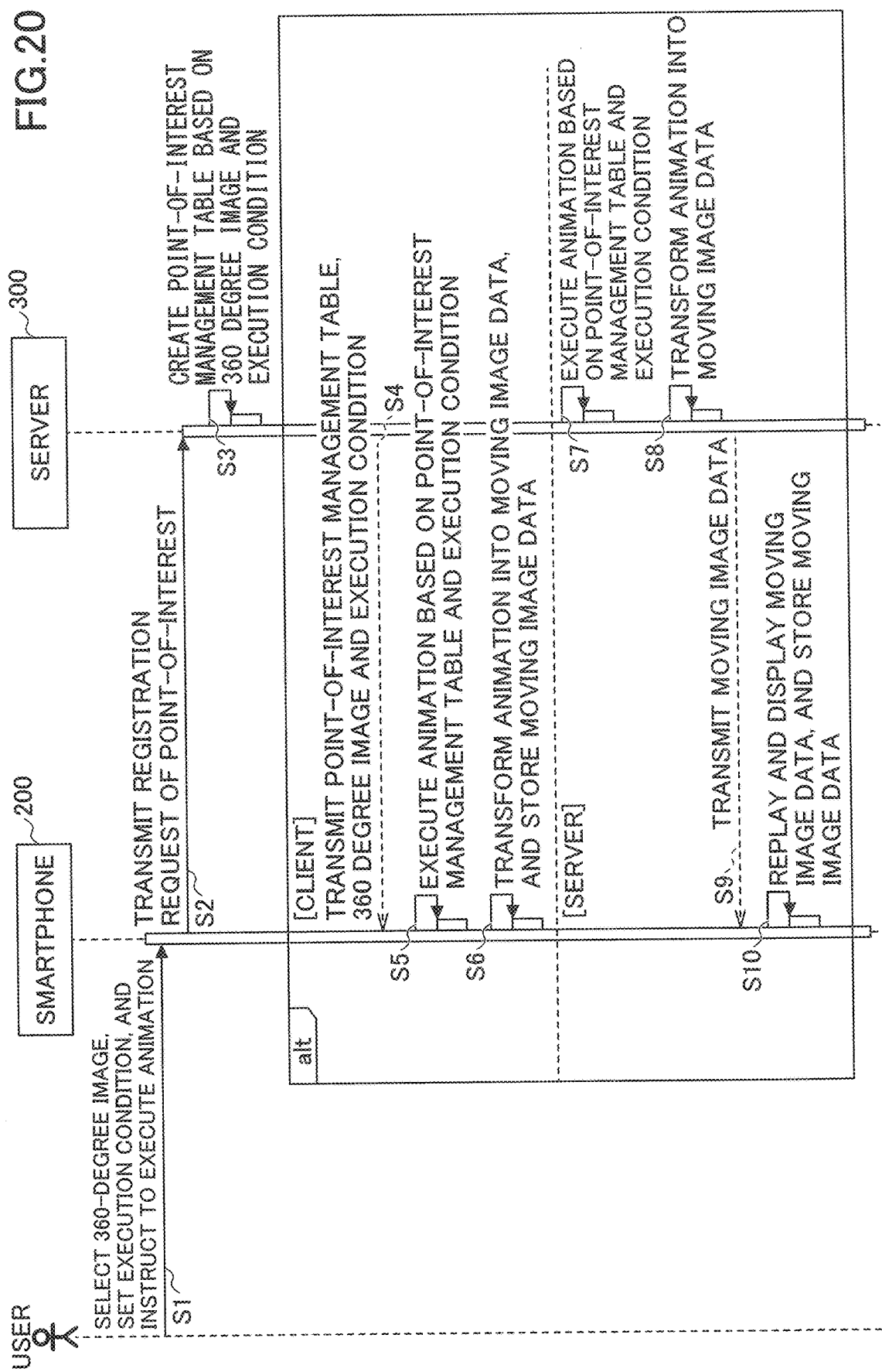
FIG. 20 is a sequence diagram illustrating an example of processing performed in instructing to execute an animation.

Next, with reference to a sequence diagram illustrated in FIG. 20, explanation will be provided for processing performed when the user instructs to execute an animation.

First, the user who has selected a desired image among 360-degree images stored in the storage area 207 sets an animation-executing condition via the parameter-setting region 80 in the UI screen (see FIG. 18) that is displayed by UI unit 202. The user then taps the replay button 72 in the animation-displaying region 70 to instruct to execute an animation (S1).

In response to the instruction described above, the registration request unit 203 generates a registration request of a point-of-interest, which includes the 360-degree image selected by the user as well as the execution condition (the number of points-of-interest, the number of loops, the stop time, and the generation location of the moving image data) set by the user, and transmits such a registration request to the server 300 (S2).

In response to the transmission described above, the server 300 creates a point-of-interest management table based on the 360-degree image and the setting of "the number of points-of-interest", which are included in the registration request of the point-of-interest (S3).

Hereafter, with reference to a flowchart illustrated in FIG. 21, explanation will be provided for processing of creating, by the server 300, a point-of-interest management table in S3.

First, in step 501, after converting the 360-degree image included in the registration request of the point-of-interest into another 360-degree image in an Equirectangular form (equidistant cylindrical projection), the partial-image dividing unit 301 spatially and equally divides the 360-degree image with respect to a shooting direction. Further, the partial-image dividing unit 301 divides the 360-degree image into a plurality of partial images by reprojecting the 360-degree image in multiple different directions. Hereafter, the processing of dividing the 360-degree image into the plurality of partial images is specifically described below.

Figure 22A:
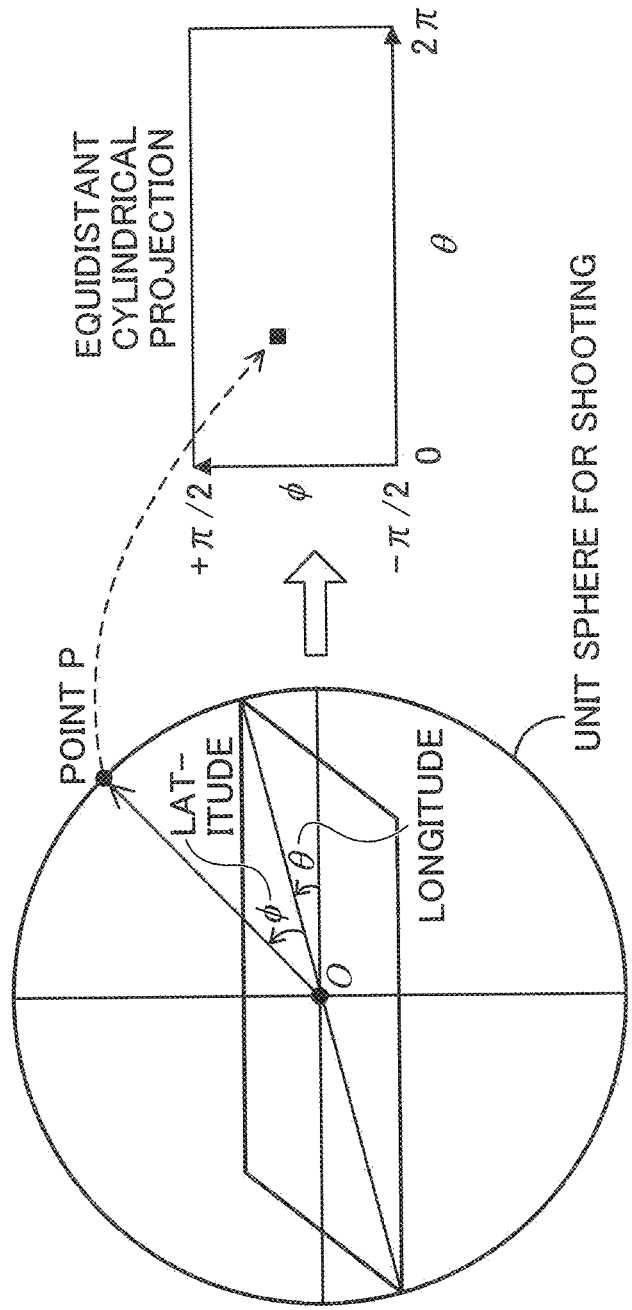
FIGS. 22A and 22B are conceptual diagrams for explaining an example of processing performed by a partial-image dividing unit.
Figure 22B:
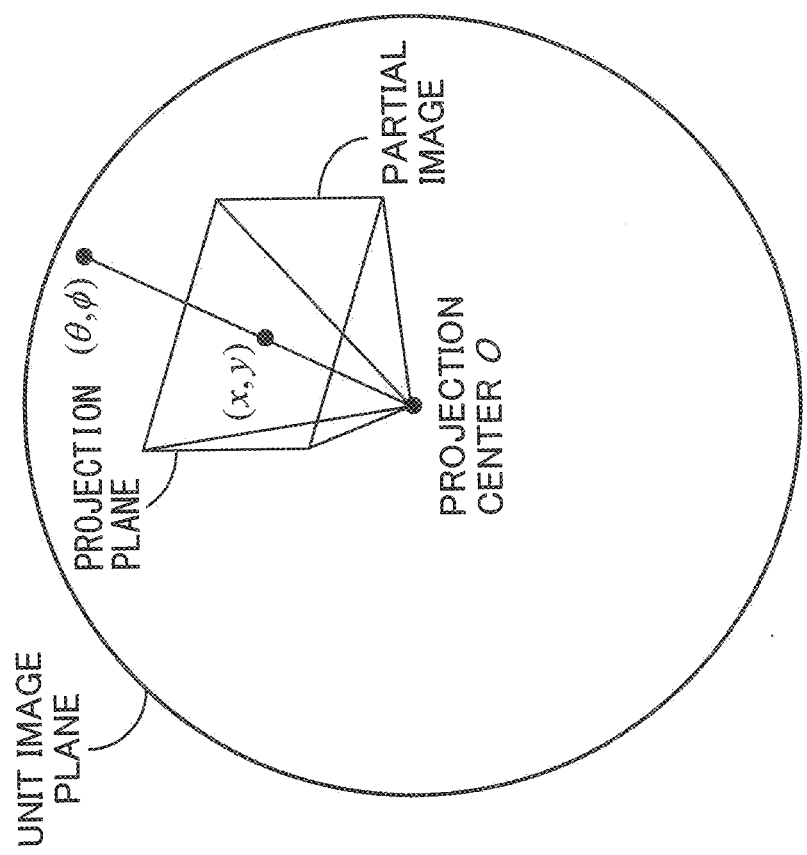

As illustrated in FIG. 22A, with use of the 360-degree image in the Equirectangular form, pixel values in predetermined 3D directions can be obtained from coordinates on latitude and longitude. The 360-degree image in the Equirectangular form can be considered as an image in which pixel values are ploted in a unit sphere. In view of this point, in the present embodiment, as illustrated in FIG. 22B, given that a predetermined projection plane is defined, and a center of the unit sphere is given as a projection center O, partial images are obtained by transforming in a perspective projection for transforming pixel values (θ, φ) of the 360-degree image in the Equirectangular form into pixel values (x,y) on the projection plane, as expressed in Formula (1) below. It is noted that in Formula (1) below, P indicates a perspective projection matrix, and an equal sign means that a left-hand side is equal to a right-hand side through multiplication of a scalar other than 0.

[Math. 1]

$$\begin{pmatrix} x \\ y \\ 1 \end{pmatrix} = P \begin{pmatrix} \cos\varphi\cos\theta \\ \cos\varphi\sin\theta \\ \sin\varphi \end{pmatrix} \quad (1)$$

Figure 23A:
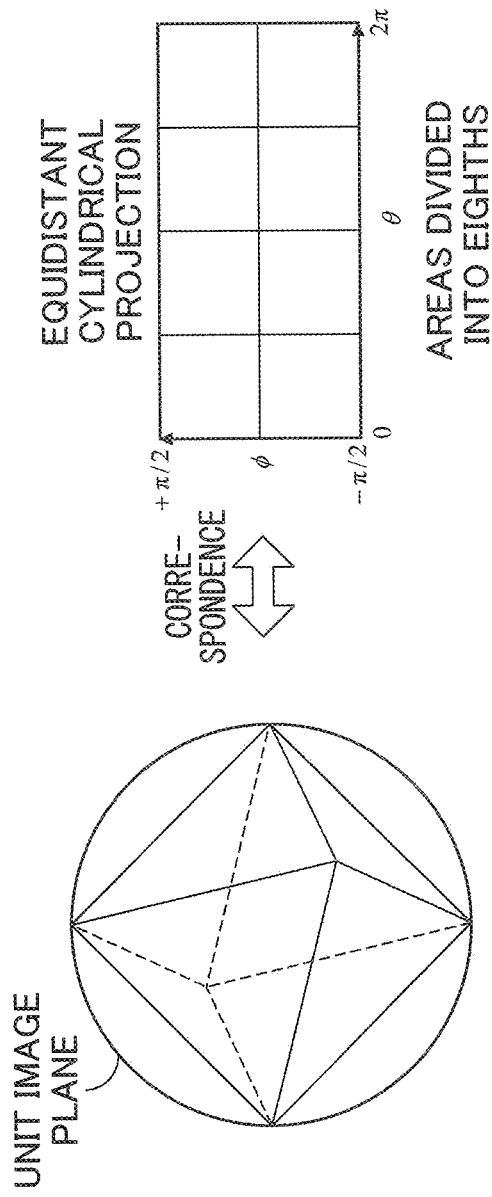
FIGS. 23A and 23B are conceptual diagrams for explaining the processing performed by the partial image dividing unit.
Figure 23B:
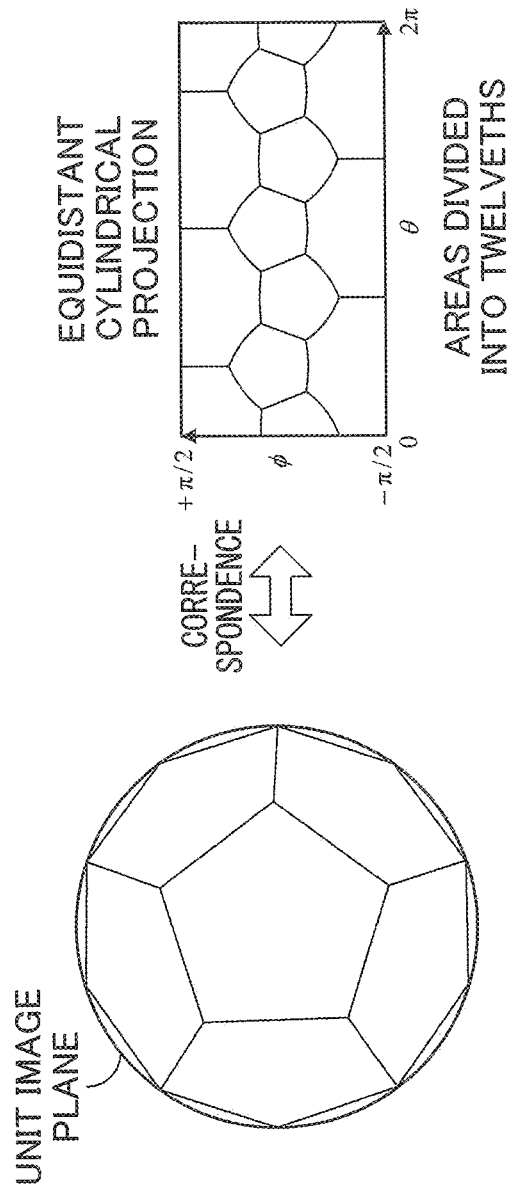

Specifically, given that as the projection plane of the 360-degree image in the Equirectangular form, a regular polyhedron having a common center to the unit sphere is defined, partial images are obtained by transforming in a perspective projection in a case where a normal direction of each plane is considered as a shooting direction. FIG. 23A illustrates an example in which a regular octahedron is used as the projection plane of the 360-degree image. FIG. 23B illustrates an example in which a regular dodecahedron is used as the projection plane of the 360-degree image.

In step 502, the feature-quantity extracting unit 302 extracts a predetermined feature quantity from each partial image obtained in step 501. It is noted that as the extracted feature quantity, a color, an edge, conspicuity, an object position/a label, LBP (Local Binary Patterns), Haar like feature, HOG (Histogram of Oriented Gradients), SIFT (Scale Invarient Feature Transform), or the like can be used by way of example.

In step 503, the importance level calculator 303 calculates, for each position (each pixel) of the 360-degree image, a level of importance based on the feature quantity extracted from each partial image. Hereafter, such a calculation is specifically described.

A regression model f is given as expressed in Formula (2) below. In Formula (2), "li" indicates a vector in which a feature quantity with respect to an i-th partial image among the partial images, which are obtained by dividing the 360-degree image into N, are aligned. Further, "g" indicates vectors in which a level of importance obtained at each position of the 360-degree image are aligned.

[Math. 2]

$$g = f(l_1, l_2, \ldots, l_N) \quad (2)$$

Here, as a specific form of the regression model f, a linear conversion as expressed in Formula (3) can be given by way of example.

[Math. 3]

$$g = W \begin{pmatrix} l_1 \\ l_2 \\ \vdots \\ l_N \end{pmatrix} + b \quad (3)$$

In Formula (3) above, each of W and b indicates a parameter. In the present embodiment, given that training data whose input is the feature quantity li and whose output is the level of importance g is preliminarily set, parameters W and b are set by learning the training data (a learning model is set).

On the premise of setting the learning model, in the present embodiment, the level of importance g that is an output (supervised data) of the training data is obtained in a suitable manner. As the simplest way of obtaining the level of importance g, the following can be used by way of example. A subject designates an area that the subject considers important, among a given image. In this case, the level of importance with respect to each pixel corresponding to the area designated by the user is set as "1". Otherwise, the level of importance (0 through 1) with respect to other pixels is set as "0". Aside from this way, the following can be also used to obtain the level of importance. After a tracking of a subject's point of gaze is obtained by an eye tracker or the like, Gaussian-Blur processing of the obtained eye track (lines) is performed. Based on contrasting densities of the blurred eye track, levels of importance (0 through 1) normalized are obtained.

In step 504, assuming that the point-of-interest is present within areas that the user considers as a high level of importance, the likelihood-distribution calculator 304 calculates a likelihood distribution of the point-of-interest based on a distribution of the levels of importance calculated in step 503. In the present embodiment, as illustrated in FIG. 24, given that an area R having a center in a shooting direction in which a viewpoint A is placed is defined on a unit image, as a point-of-interest likelihood of the viewpoint A, an addition value obtained by adding the level of importance at each position within the area R can be calculated. Also, in the present embodiment, given that a weight is added to the level of importance at each position within the area R so that the level of importance can decrease in accordance with distance from the viewpoint A, as the point-of-interest likelihood of the viewpoint A, a weighted addition value of the level of importance obtained using the weight can be also calculated.

Here, when a 3D vector in the shooting direction is represented by p, and the level of importance with respect to the shooting direction q is represented by g(q), the point-of-interest likelihood a(q) can be formulated as expressed in Formula (4) below.

[Math. 4]

$$a(p) = \eta(\int g(q)w(p,q)dq) \quad (4)$$

In Formula (4) above, η denotes a monotonically increasing function, and w(p,q) denotes a weight. The integral is definite integral, and an integral range covers an entire projection unit sphere. In the present embodiment, given that r can indicate an exponential function, w(p,q) can be a function as expressed in Formula (5) below.

[Math. 5]

$$w(p,q) = \exp(\alpha p^T q) \quad (5)$$

Formula (5) above is based on a von Mises distribution. In a case where directions p and q are the same direction, w(p,g) has a maxium value. In a case where the directions p and q are a different direction, w(p,g) has a minimum value. In the present embodiment, an attenuation rate of the weight can be determined by the parameter α, and thus an angle of field with respect to the point-of-interest can be reflected accordingly.

Also, in the present embodiment, given that weight w(p,g) is defined as a parameter of {αi}, as expressed in Formula (6) below, a polynomial equation of an inner product of the directions p and q can be used as an argument of an exponential function.

[Math. 6]

$$w(p, q) = \exp\left(\sum_i \alpha_i (p^T q)^i\right) \quad (6)$$

Referring back to FIG. 21, explanation will be provided.

In step 505, the point-of-interest calculator 305 calculates a local maximum value of the point-of-interest likelihood a(p). Here, in a case where in the registration request of the point-of-interest, a setting value of "the number of points-of-interest" is M (M is an integer of two or more), the point-of-interest calculator 305 calculates M local maximum values with respect to the point-of-interest likelihood a(p). It is noted that the local maximum value of the point-of-interest likelihood a(p) can be calculated by searching with a hill climbing method, using an initial value of p randomly generated. Next, M shooting directions p corresponding to the calculated M local maximum values are calculated. A position in each shooting direction is obtained as the point-of-interest. Specifically, M shooting directions p1, p2, . . . , pM, which maximize the evaluation function expressed in Formula (7) below, are calculated. Next, point-of-interest (θ, φ) in each direction is obtained.

[Math. 7]

$$J = \sum_{i=1}^{M} a(p_i) + d(p_1, p_1, \Lambda, p_M) \quad (7)$$

It is noted that in Formula (7) above, d denotes a function in which a distance between the viewpoints is represent. In such a function, dispersions of p1, p2, . . . , pM, or a total of Euclidean distances between the viewpoints can be used by way of example. By using such an evaluation function, M points-of-interest separately placed can be obtained.

In step 506, the point-of-interest registering unit 306 creates the point-of-interest management table according to the following procedure. Specifically, first, 3D coordinates (x,y,z) on the 360-degree image, which correspond to the M points-of-interest (θ, φ) calculated in step 505 are calculated, and then these 3D coordinates (x,y,z) are obtained as M points-of-interest.

Next, the obtained M points-of-interest (x,y,z) are sequentially registered in a table according to a predetermined rule. In the present embodiment, for example, given that a point-of-interest (home position) used as a reference is preliminarily determined on the 360-degree image, among the obtained M points-of-interest, a point-of-interest located at the nearest neighbor of the home position is registered first. Further, among the remaining (M−1) points-of-interest, a point-of-interest located at the nearest neighbor of the first point-of-interest is registered in the second place. Further, among the remaining (M−2) points-of-interest, a point-of-interest located at the nearest neighbor of the second point-of-interest is registered in the third place. By repeating such a procedure, the M points-of-interest are sequentially registered in the table. FIG. 25 illustrates the point-of-interest management table 700 created in such a way.

Referring back to FIG. 20, explanation will be provided.

In S3, after the server 300 creates the point-of-interest management table 700, the process selectively proceeds according to settings of the "generation location of moving image data" included in the registration request of the point-of-interest.

First, in a case where the settings of the "generation location of moving image data" indicate "client", the server 300 transmits, to the smartphone 200, the point-of-interest table 700 created in S3, as well as the 360-degree image and the execution condition (the number of loops and the stop time) that are received in S2 (S4).

In response to the transmission, the point-of-interest controller 204 of the smartphone 200 causes a transition of the point-of-interest on the 360-degree image received in S4, along a pathway for interpolating with respect to the points-of-interest registered in the point-of-interest management table 700 received in S4 in order of registering the points-of-interest. Further, the animation executing unit 205 executes an animation that allows the partial images, each of which has a center at a partial-image-specific point-of-interest intended for the transition, to be displayed according to the execution condition (the number of loops and the stop time) received in S4 (S5). After this execution, the moving-image-data generator 206 converts the animation executed in S5 into a moving image data in a universal file format to store the moving image data in the storage area 207 (S6).

It is noted that in completing the generating of the moving image data, the smartphone 200 transmits a notification of completing the generating of the moving image data to the server 300. In order to protect individual information, the server 300 that has received the notification may delete the 360-degree image or the execution condition received from the smartphone 200, information stored in the point-of-interest management table, or the like.

On the other hand, in a case where the settings of the "generation location of moving image data" indicate "server", the point-of-interest controller 204 of the smartphone 200 causes a transition of a point-of-interest on the 360-degree image received in S2, along a pathway for interpolating with respect to the points-of-interest registered in the point-of-interest management table 700 created in S3 in order of registering the points-of-interest. Further, the animation executing unit 308 executes an animation that allows the partial images, each of which has a center at a partial-image-specific point-of-interest intended for the transition, to be displayed according to the execution condition (the number of loops and the stop time) received in S2 (S7). After this execution, the moving-image data generator 309 converts the animation executed in S7 into a moving image data in a universal file format (S8).

Next, the server 300 transmits the moving image data converted in S8 to the smartphone 200 (S9). In response to the transmission, the smartphone 200 replays and displays the received moving image data, and then stores the moving image data in the storage area 207 (S10).

It is noted that in receiving the moving image data, the smartphone 200 transmits a notification of receiving the moving image data to the server 300. In order to protect individual information, the server 300 that has received the notification may delete the 360-degree image or the execution condition received from the smartphone 200, information stored in the point-of-interest management table, the moving image data, or the like.

As described above, according to another embodiment, without an effort of causing the user to register a point-of-interest, the area-of-interest of the 360-degree image can be presented by the animation in such a way that is visually recognizable. It is noted that in the present embodiment, the 360-degree image is used as a preferable content applied to the disclosure of the present embodiments. However, aside from the 360-degree image, other images can be applicable to the disclosure of the embodiments as long as an image has an angle of view of 180 degrees or more in the shooting. In such a way, with respect to images that have a wide angle of view and that are not easily displayed in a normal display screen, extending a display representation can improve a user's interest in such images.

Next, with reference to FIGS. 26A and 26B, explanation will be provided below for hardware configurations according to the embodiments.

Figure 26A:
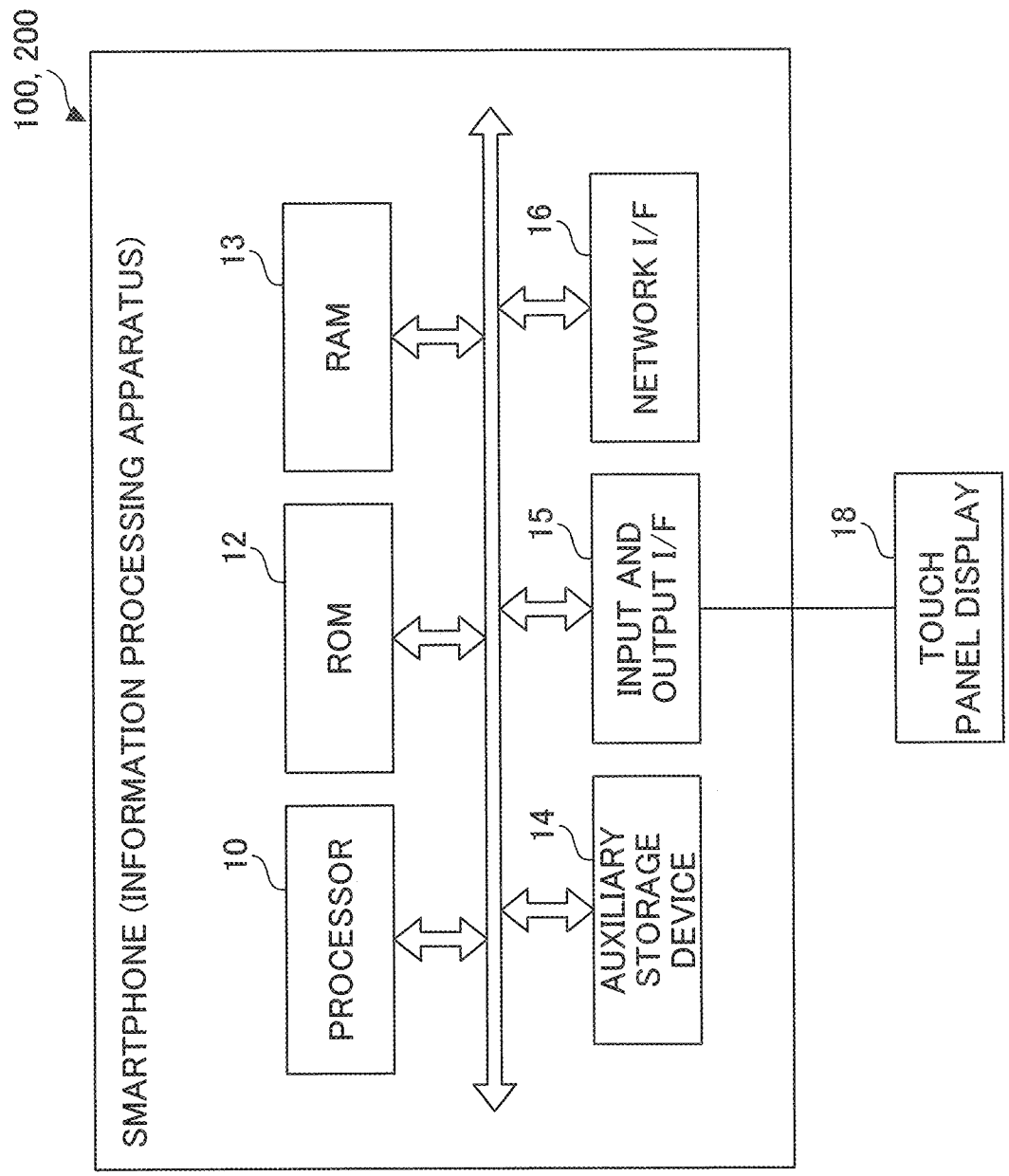

As illustrated in FIG. 26A, a computer provided with each of smartphones 100 and 200 according to the embodiments includes a processor 10 that controls an entire operation of a device, a ROM (Read-only Memory) 12 that stores a boot program or a firmware program, etc., and a RAM (Random Access Memory) 13 that provides a space for executing a program. The computer also includes an auxiliary storage device 314 for storing a program that causes the computer to serve as each component described above, an operating system (OS), and the like. Further, the computer includes an input and output interface 15 for connecting to the touch panel display 18 and the like, as well as a network interface 16 for connecting to a network 60.

As illustrated in FIG. 26B, a computer provided with the server 300 according to the embodiments includes a processor 310 that controls an entire operation of a device, a ROM 312 that stores a boot program or a firmware program, etc., and a RAM 313 that provides a space for executing a program. The computer also includes an auxiliary storage device 314 for storing a program that causes the computer to serve as each component described above, an operating system (OS), and the like. Further, the computer includes an input and output interface 315 as well as a network interface 316 for connecting to the network 60.

It is noted that each function in the embodiments described above can be implemented by a program described by C, C++, C#, Java (registered trademark) or the like. The program in the present embodiment can be distributed by storing a recording medium such as a CD (Compact Disk)-ROM, a MO (Magnetic-Optical disk), a DVD (Digital Versatile Disk), a flexible disk, an EEPROM (Electrically Erasable Programmable Read-Only Memory), an EPROM (Erasable Programmable Read-Only Memory) or the like. Alternatively, other devices can transmit the program in an available form via the network.

The disclosure of the embodiments has been described above, but is not limited to the disclosure described above. The scope of embodiments that may be led by those skilled in the art also falls within the scope of the present invention as long as such embodiments have a similar effect.

What is claimed is:

1. An information processing apparatus, comprising:
    processing circuitry configured to
        generate a partial image, having a point-of-interest designated by a user, from a 360-degree image, and display the generated partial image,
        accept a registration request of the designated point-of-interest from the user via a user interface (UI) screen displaying the generated partial image,
        register the designated point-of-interest, in response to the registration request from the user via the UI screen,
        calculate an interpolation line interpolating between a most recently registered point-of-interest and the designated point-of-interest,
        register the interpolation line between the designated point-of-interest and the most recently registered point-of-interest registered immediately prior to the designated point-of-interest, and
        display the interpolation line and the designated point-of-interest superimposed on the partial image in the UI screen.

2. The information processing apparatus according to claim 1, wherein the UI screen includes an icon-displaying region displaying point-of-interest icons corresponding to designated points-of-interest in order of registering the designated points-of-interest,
    wherein in response to selecting a point-of-interest icon in the icon-displaying region, the processing circuitry is further configured to accept a change to a corresponding point-of-interest; and
    wherein the processing circuitry is further configured to recalculate a particular interpolation line interpolating between the corresponding point-of-interest and another registered point-of-interest immediately preceding or following the corresponding point-of-interest.

3. The information processing apparatus according to claim 2, wherein the each point-of-interest icon is a thumbnail of the partial image having a center at the corresponding designated point-of-interest.

4. The information processing apparatus according to claim 2, wherein in response to selecting the point-of-interest icon, the processing circuitry is further configured to accept a deletion of a corresponding point-of-interest, and
    wherein the processing circuitry is further configured to calculate a new interpolation line interpolating between a registered point-of-interest immediately preceding the deleted point-of-interest and a registered point-of-interest immediately following the deleted point-of-interest.

5. The information processing apparatus according to claim 2, wherein the processing circuitry is further configured to
    cause a transition of a point-of-interest along a pathway interpolating with respect to at least two registered points-of-interest of the designated points-of-interest; and
    execute an animation that allows at least two partial images, each of which has a center at a partial-image-specific point-of-interest intended for the transition, to be displayed in order of transitioning points-of-interest,
    display, in the icon-displaying region, interpolation-line icons corresponding to registered interpolation lines, and
    in response to selecting an interpolation-line icon, accept a setting of a parameter for the animation executed along the pathway corresponding to the selected interpolation-line icon.

6. The information processing apparatus according to claim 5, wherein the processing circuitry is further configured to display the points-of-interest and the point-of-interest icons such that correspondences between the points-of-interest and the point-of-interest icons are visually recognizable, and display the interpolation lines and the interpolation-line icons such that correspondences between the interpolation lines and the interpolation-line icons are visually recognizable.

7. The information processing apparatus according to claim 1, wherein the processing circuitry is further configured to distinctly display points-of-interest or interpolation lines.

8. The information processing apparatus of claim 1, wherein the UI screen includes an icon-displaying region displaying point-of-interest icons corresponding to designated points-of-interest in order of registering the designated points-of-interest.

9. The information processing apparatus of claim 1, wherein the processing circuitry is further configured to generate the partial image from the 360-degree image using a projective transformation.

10. The information processing apparatus of claim 1, wherein the processing circuitry is further configured to display the partial image so that a center of the displayed partial image coincides with the designated point-of-interest.

11. A non-transitory recording medium storing a program that, when executed by processing circuitry, causes the processing circuitry to execute a method, the method comprising:
    generating a partial image having a point-of-interest designated by a user, from a celestial sphere image and displaying the generated partial image;
    accepting a registration request of the designated point-of-interest from the user via a user interface (UI) screen displaying the generated partial image;
    registering the designated point-of-interest, in response to the registration request from the user via the UI screen;
    calculating an interpolation line interpolating between a most recently registered point-of-interest and the designated point-of-interest;
    registering the interpolation line between the designated point-of-interest and the most recently registered point-of-interest registered immediately prior to the designated point-of-interest; and
    displaying the interpolation line and the designated point-of-interest superimposed on the partial image in the UI screen.

* * * * *